United States Patent [19]

Maeda

[11] Patent Number: 5,317,519

[45] Date of Patent: May 31, 1994

[54] MACHINING STIMULATION SYSTEM

[75] Inventor: Takeharu Maeda, Niwa, Japan

[73] Assignee: Okuma Corporation, Aichi, Japan

[21] Appl. No.: 896,045

[22] Filed: Jun. 8, 1992

[30] Foreign Application Priority Data

Jun. 14, 1991 [JP] Japan .................................. 3-169277

[51] Int. Cl.⁵ ............................................... G06F 15/46
[52] U.S. Cl. .......................... 364/474.26; 364/474.22;
395/164
[58] Field of Search ...................... 364/474.22–474.27;
395/463, 164

[56] References Cited

U.S. PATENT DOCUMENTS

| | | | |
|---|---|---|---|
| 5,079,713 | 1/1992 | Kawamura et al. | 364/184 |
| 5,150,305 | 9/1992 | Sekikawa | 364/474.24 |
| 5,175,688 | 12/1992 | Sasaki et al. | 364/474.26 |

Primary Examiner—Jerry Smith
Assistant Examiner—Cameron H. Tousi
Attorney, Agent, or Firm—Wenderoth, Lind & Ponack

[57] ABSTRACT

In a machining simulation system, reading from a shape memory in place of a graphic memory is effected synchronizing with scanning of a display device because of a material shape being held in the shape memory. The step of graphic memory depiction can be omitted by a cross-section display circuit for generating video signals. The animation picture can be speeded up regardless of a processing capability of a CPU. Further, data structures of the material and tool shapes are relatively simple. Hence, a change of the material shape can be speeded up irrespective of the CPU processing capability due to a shape change circuit for effecting a comparative arithmetic operation by directly reading the material shape from the shape memory and the tool shape from the pattern memory.

5 Claims, 32 Drawing Sheets

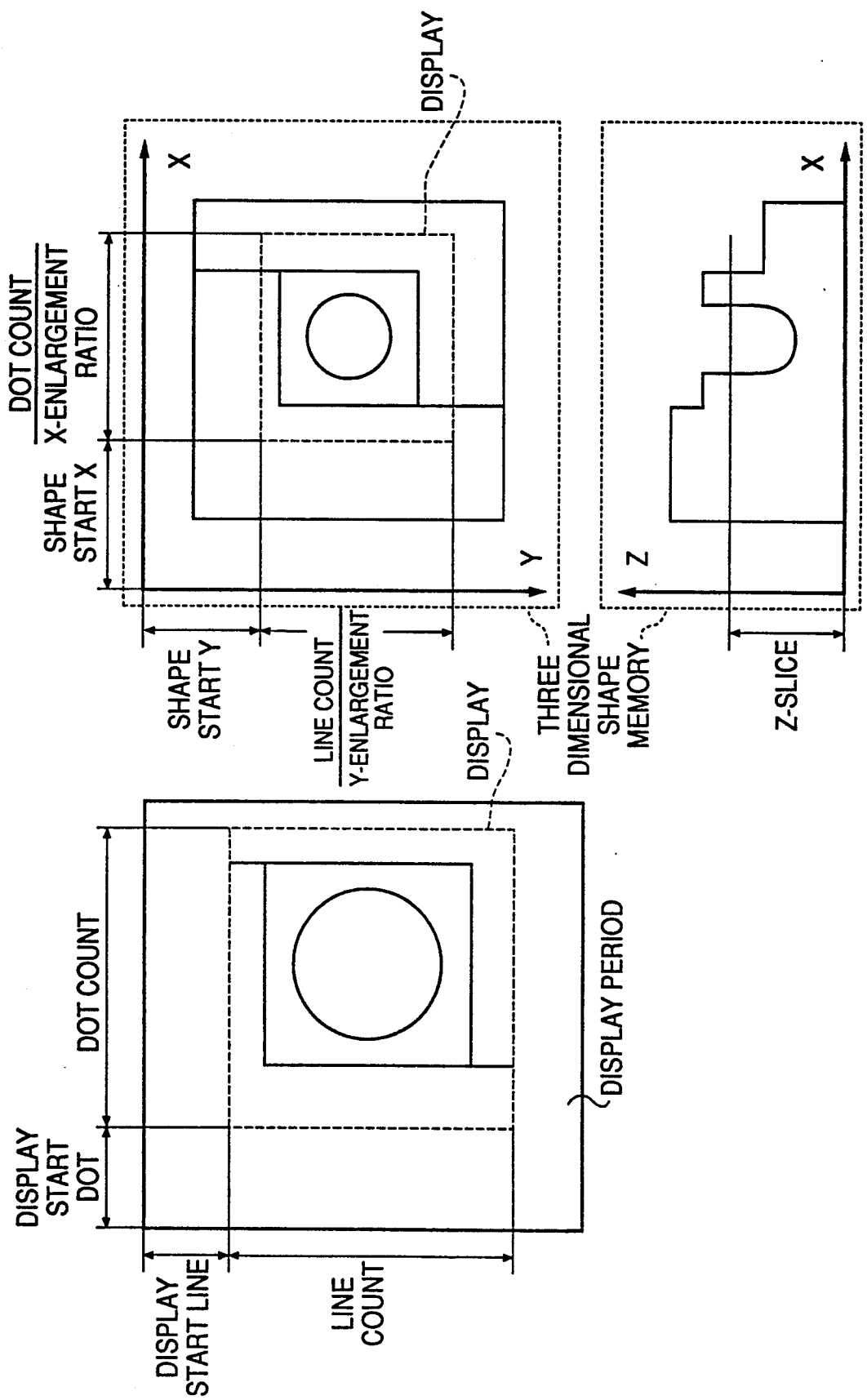

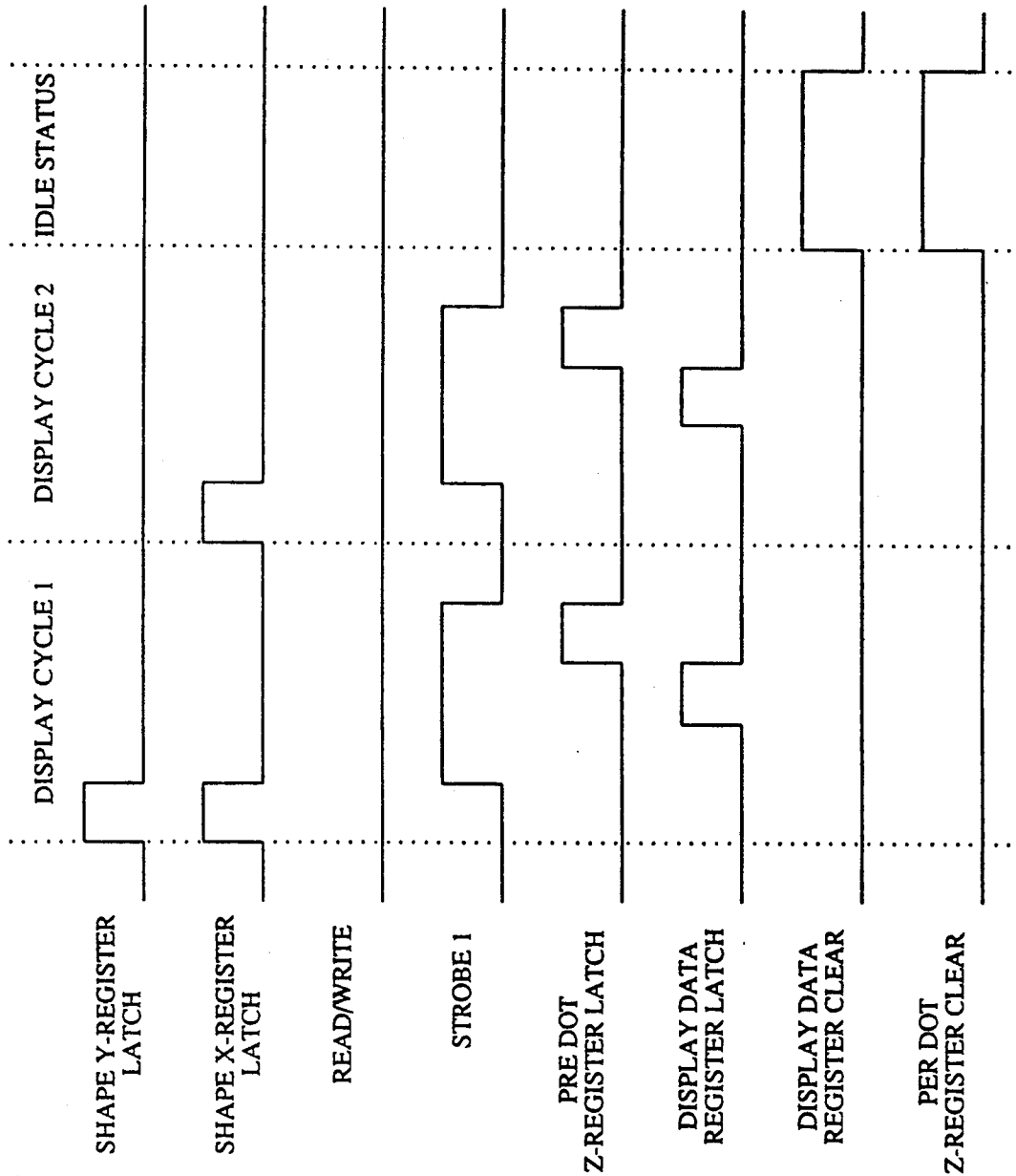

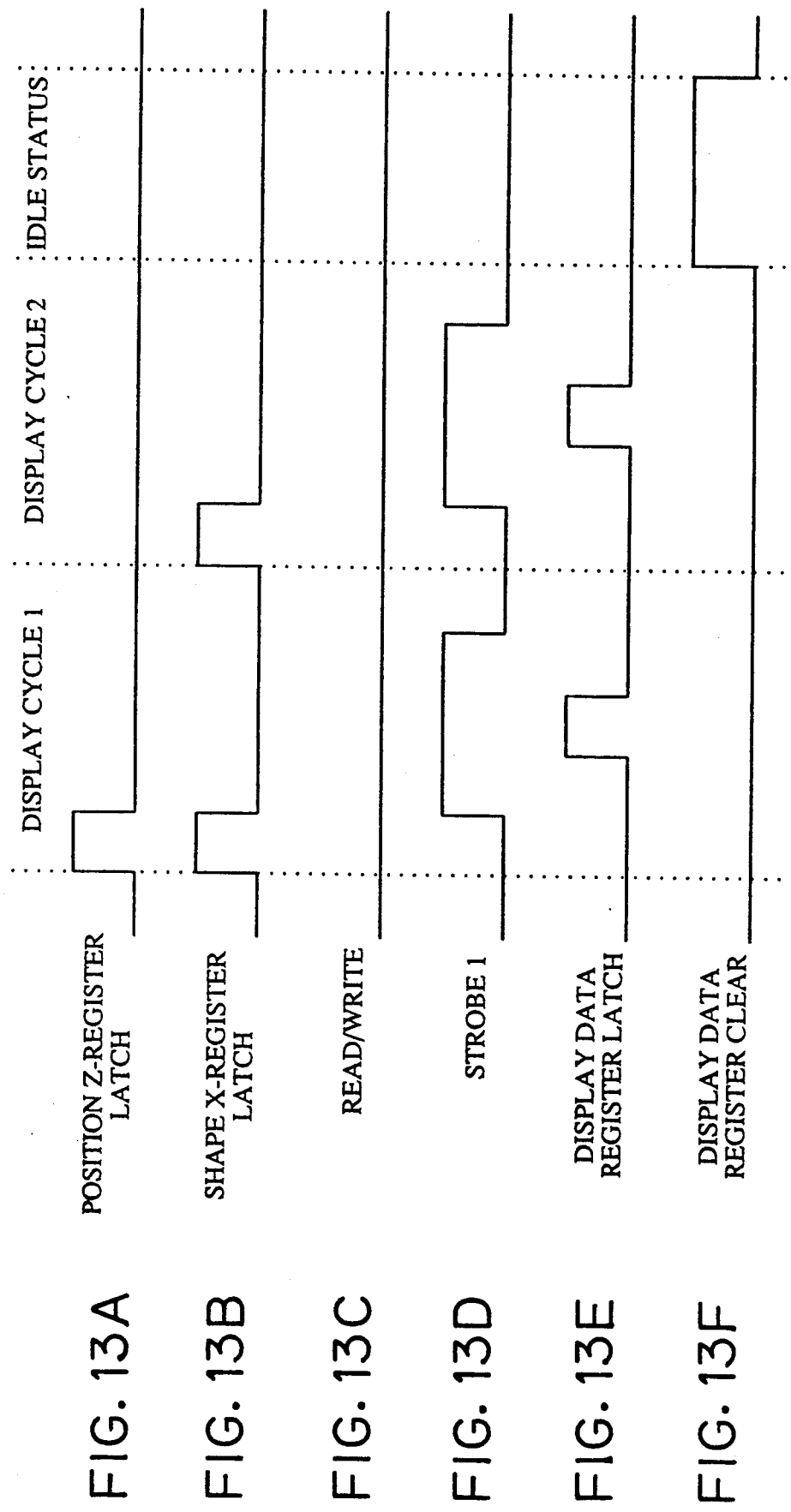

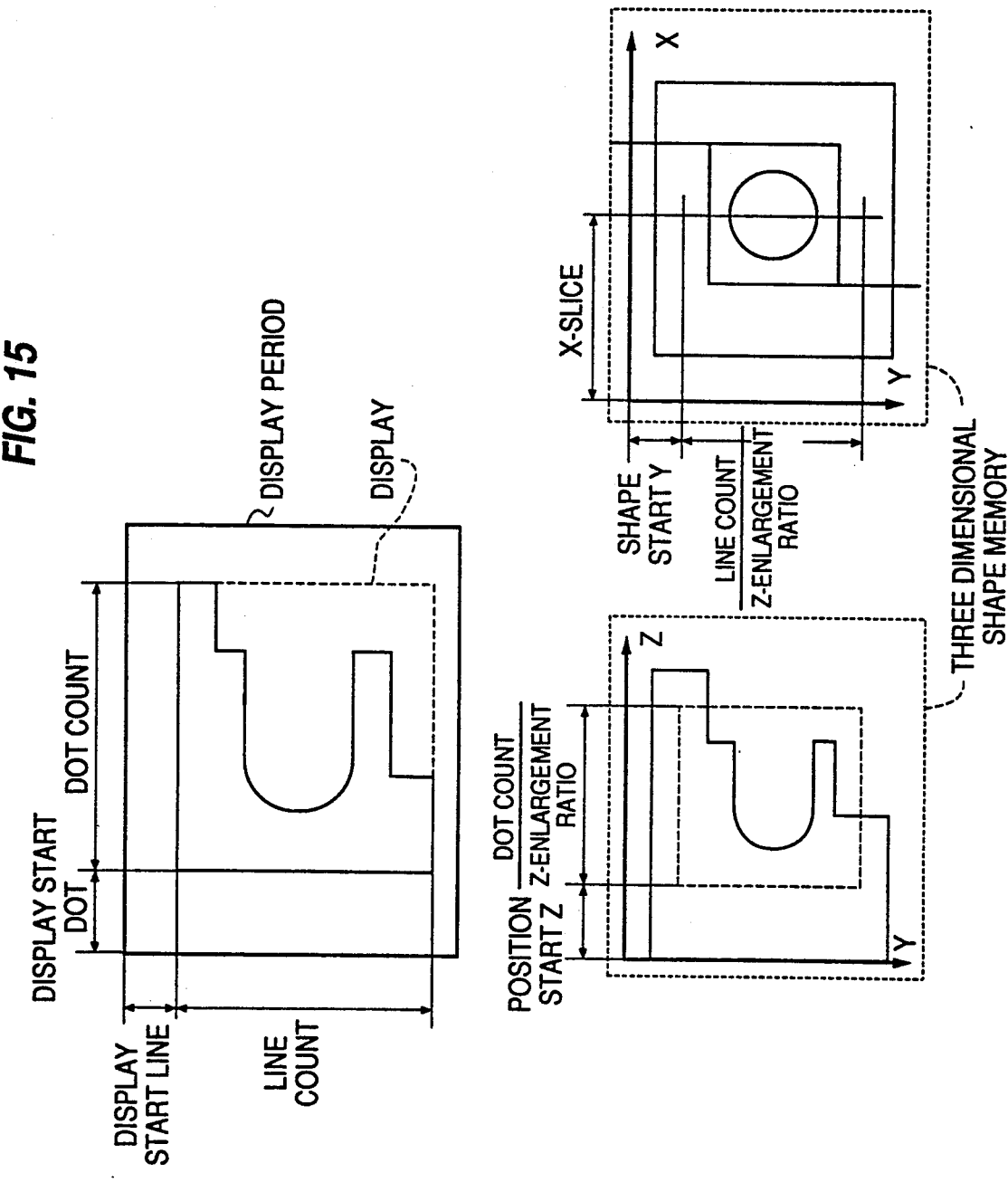

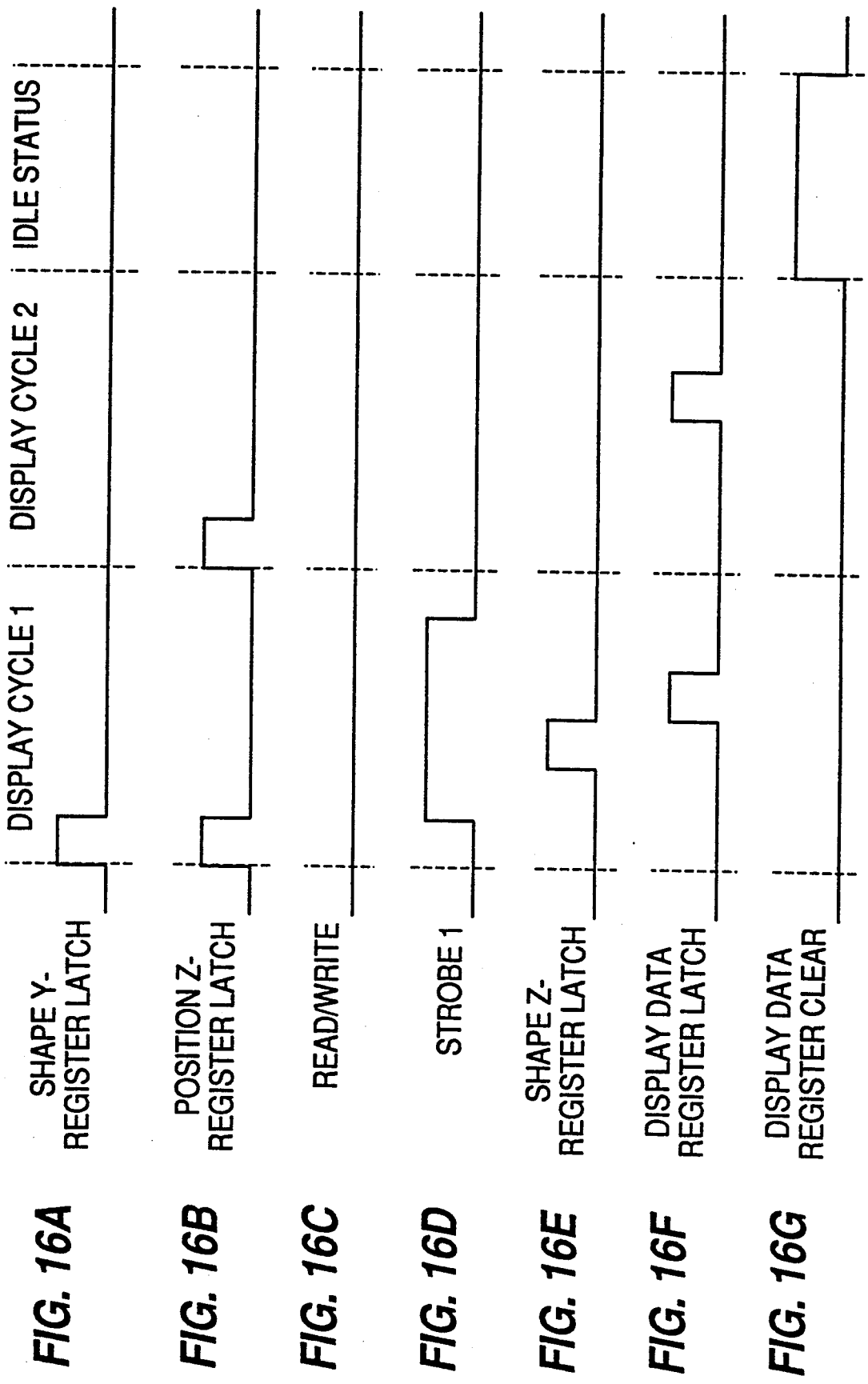

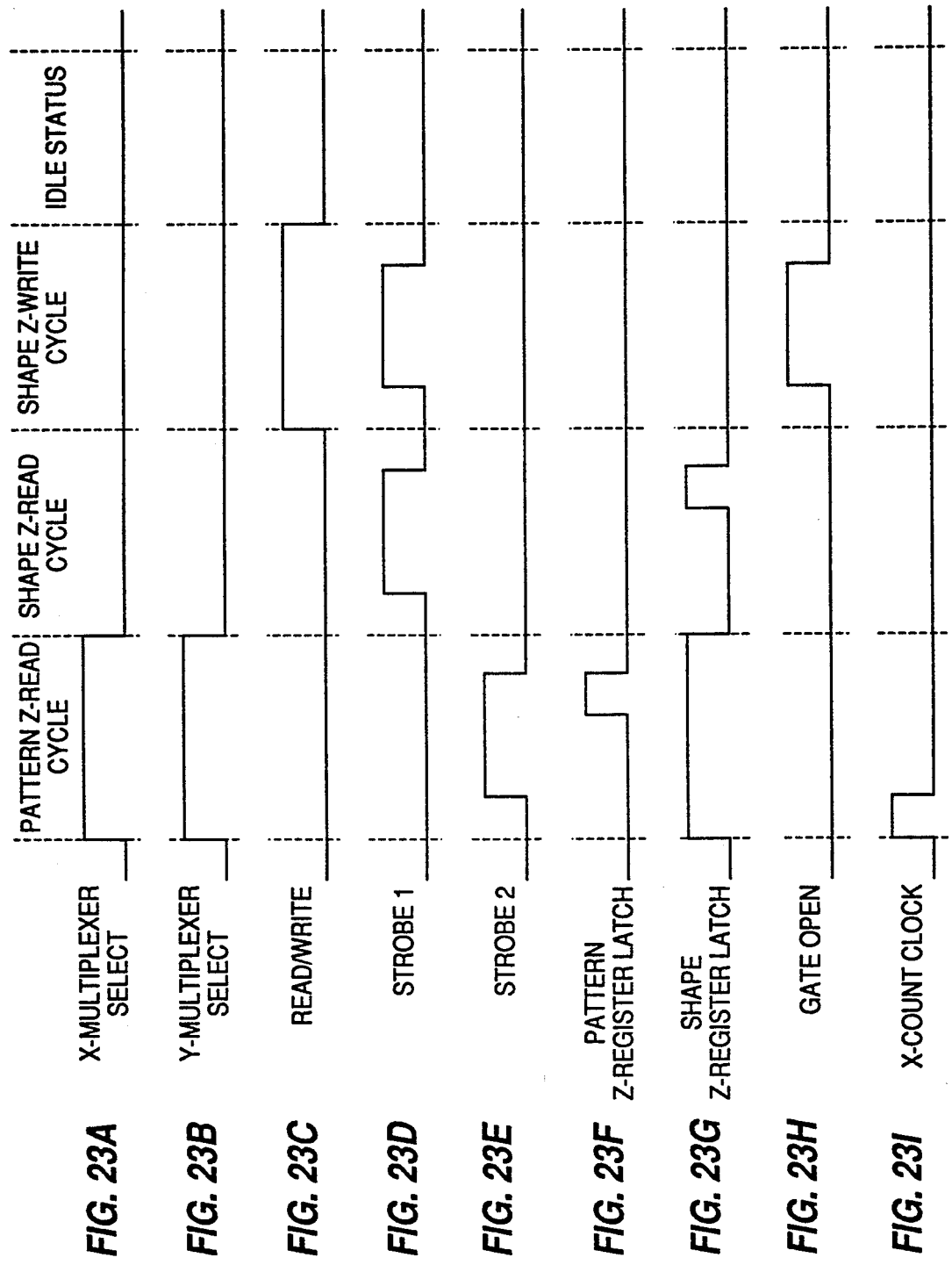

MACHINING STIMULATION SYSTEM

BACKGROUND OF THE INVENTION

1. Field of the Invention

The present invention relates generally to a machining simulation system used for confirming a numerical control (NC) program and, more particularly, to the display of a cross-section and a plane of a three-dimensional shape.

2. Related Background Art

Machining simulation is know in which a tool working a material is displayed as an animation picture. This machining simulation exhibits such advantages that: it is possible to quickly easily confirm a mistake in an NC program and conditions, good or bad, of machining procedures before actual machining is performed; a machining deterioration and a machine impingement can be prevented; dry running is unnecessary; and a machine operation rate can be improved.

FIG. 1 is a block diagram showing one example of a conventional machining simulation system. An operator proceeds with a check of an NC program by inputting a command from a keyboard 1, confirming a system operation by seeing characters and graphics of a display device 2 and inputting the next command as needed. The input from the keyboard 1 is interpreted as a command, and an internal arithmetic operation is performed in accordance therewith. The display is effected by changing contents of a character memory 3 and a graphic memory 4. All these operations are executed by a CPU 6 in conformity with the program stored in a ROM 5. On this occasion, an operation storage area within a RAM 7 is employed. Prepared further is a read command for inputting the NC program. The NC program is inputted from a medium 9 through an I/O (input/output) device 8 and transferred to the NC program storage area within the RAM 7.

Before executing the machining simulation, data representing a material shape and data representing a tool shape are developed in a material shape storage area and a tool shape storage area within the RAM 7. The material shape and the tool shape are specified based on the NC program or in accordance with the operator's inputs from the keyboard 1. For displaying an animation picture, there are effected step-by-step reading from the NC program storage area and interpretations thereof. A tool position per unit time is calculated. Next, when the tool shape is put in the tool position, an intruding portion into the material shape is calculated, thereby changing the material shape. This material shape is read, and a variety of converting processes are carried out. The material shape is depicted on the graphic memory 4, thus displaying a projected plane and a cross-section thereof. The material appears to be machined by consecutively executing these processes at short time intervals.

The conventional machining simulation system described above presents the following problems. It is important to shorten the display time intervals by speeding up the processes associated with the change of the material shape and the graphic memory depiction in order to effectively display the animation picture. If the time interval increases, the motion becomes rough, and fine motions can not be seen, or the time required for the machining simulation increases. Further, the processing time is reduced with a decline of the resolution of the material shape. However, the details of the shape can not be seen. In any case, it follows that those are contrary to the object of the machining simulation.

A method has been proposed of simply reducing the processing time by using a parallel computer and a high-speed CPU having a high arithmetic capability. The system itself, however, becomes very expensive. It is therefore difficult to incorporate the machining simulation system in a NC system and an automatic programming system for wide use at production sites to improve productivity.

Under such circumstances, it is difficult to display the high-speed animation picture especially in the three-dimensional display. A machining simulation system is desired which is capable of displaying the animation picture without using an expensive CPU.

SUMMARY OF THE INVENTION

It is a primary object of the present invention, which has been devised under such circumstances, to provide a machining simulation system capable of displaying a high-speed animation picture without employing an expensive CPU.

To accomplish this object, according to one aspect of the invention, there is provided a machining simulation system for displaying a situation where a tool works a material as an animation picture, comprising: a material shape storage circuit for storing a shape of the material; and a display circuit for displaying a cross-section of the material shape on the basis of the material shape read from the material shape storage circuit. The machining simulation system further includes a tool shape storage circuit for storing a shape of the tool and a change circuit for changing the material shape stored in the material shape storage circuit on the basis of the tool shape read from the tool shape storage circuit.

According to the present invention, the material shape is held in a shape memory, and hence reading from the shape memory in place of the graphic memory is effected in synchronization with scanning of a display device. The step of graphic memory depiction can be omitted by a cross-section display circuit for generating video signals. The animation picture process can be speeded up irrespective of the capability of a CPU.

Further, data structures of the material and tool shapes are relatively simple. Hence, a change of the material shape process can be speeded up irrespective of the CPU processing capability due to a shape change circuit for effecting a comparative arithmetic operation by directly reading the material shape from the shape memory and the tool shape from the pattern memory.

BRIEF DESCRIPTION OF THE DRAWINGS

Other objects and advantages of the present invention will become apparent during the discussion which follows taken in conjunction with the accompanying drawings, in which:

FIG. 6 is a diagram showing correspondences of display operations to contents of a register group of the X-Y plane cross-section display circuit depicted in FIGS. 5A to 5C;

FIGS. 7A to 7H are time charts showing operation cycles of a video signal generation section of the X-Y plane cross-section display circuit illustrated in FIGS. 5A to 5C;

FIGS. 13A to 13F are time charts of assistance in explaining operation cycles of a cycle control circuit of the Z-X plane cross-section display circuit illustrated in FIGS. 11A to 11C;

FIG. 15 is a diagram showing correspondences of the display operations to contents of a mode register section of the Y-Z plane cross-section display circuit illustrated in FIGS. 14A to 14C;

FIGS. 16A to 16G are time charts of assistance in explaining the operation cycles of the cycle control circuit of the Y-Z plane cross-section display circuit depicted in FIGS. 14A to 14C;

FIGS. 23A to 23I are time charts of assistance in explaining the operation cycles of the cycle control circuit of an arithmetic/control section illustrated in FIGS. 21A to 21C.

DETAILED DESCRIPTION OF THE PREFERRED EMBODIMENT

The present invention will hereinafter be described in detail by way of an illustrative embodiment with reference to the accompanying drawings.

Figure 1:
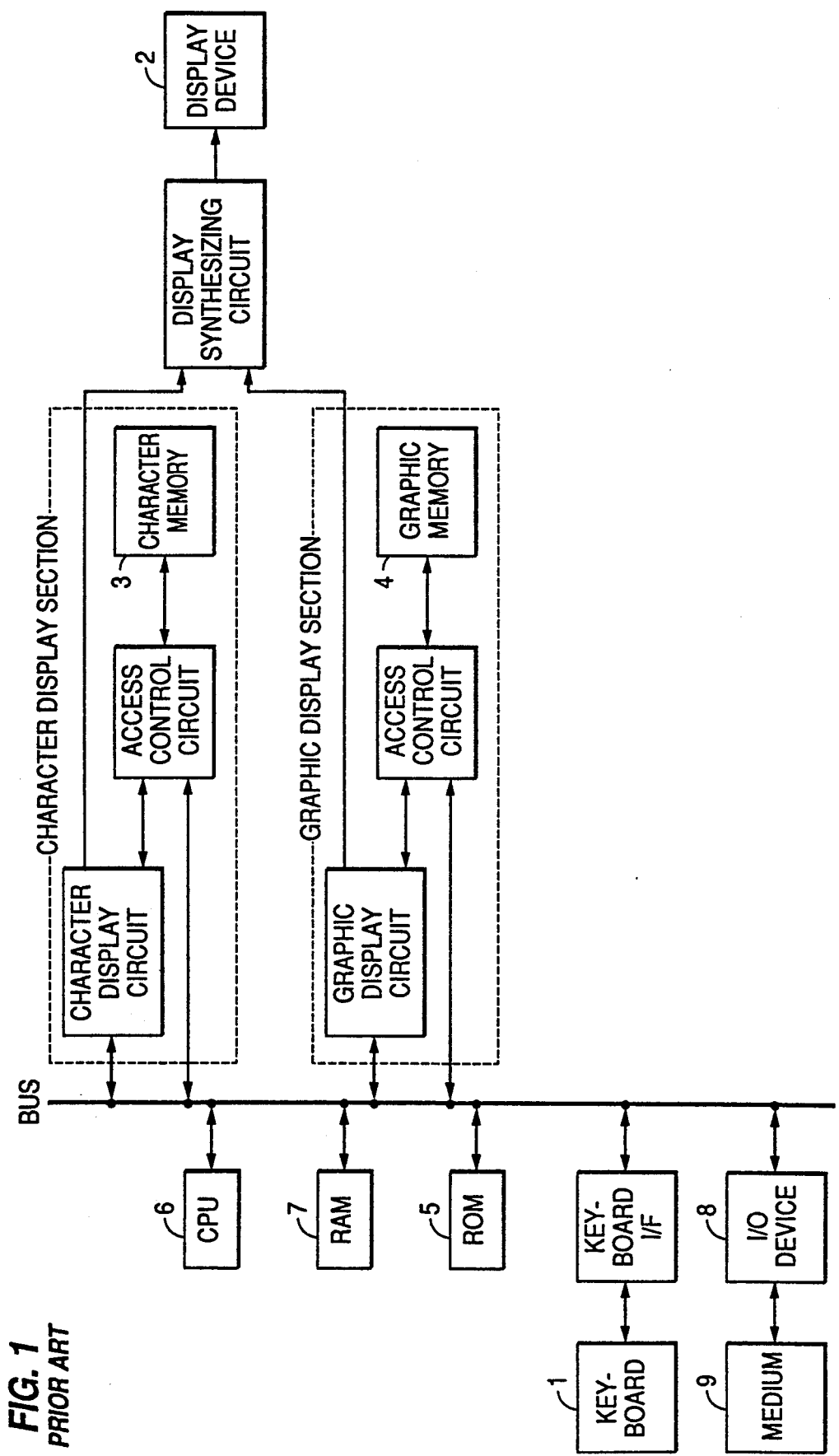
FIG. 1 is a block diagram showing one example of a conventional machining simulation system.
Figure 2A:
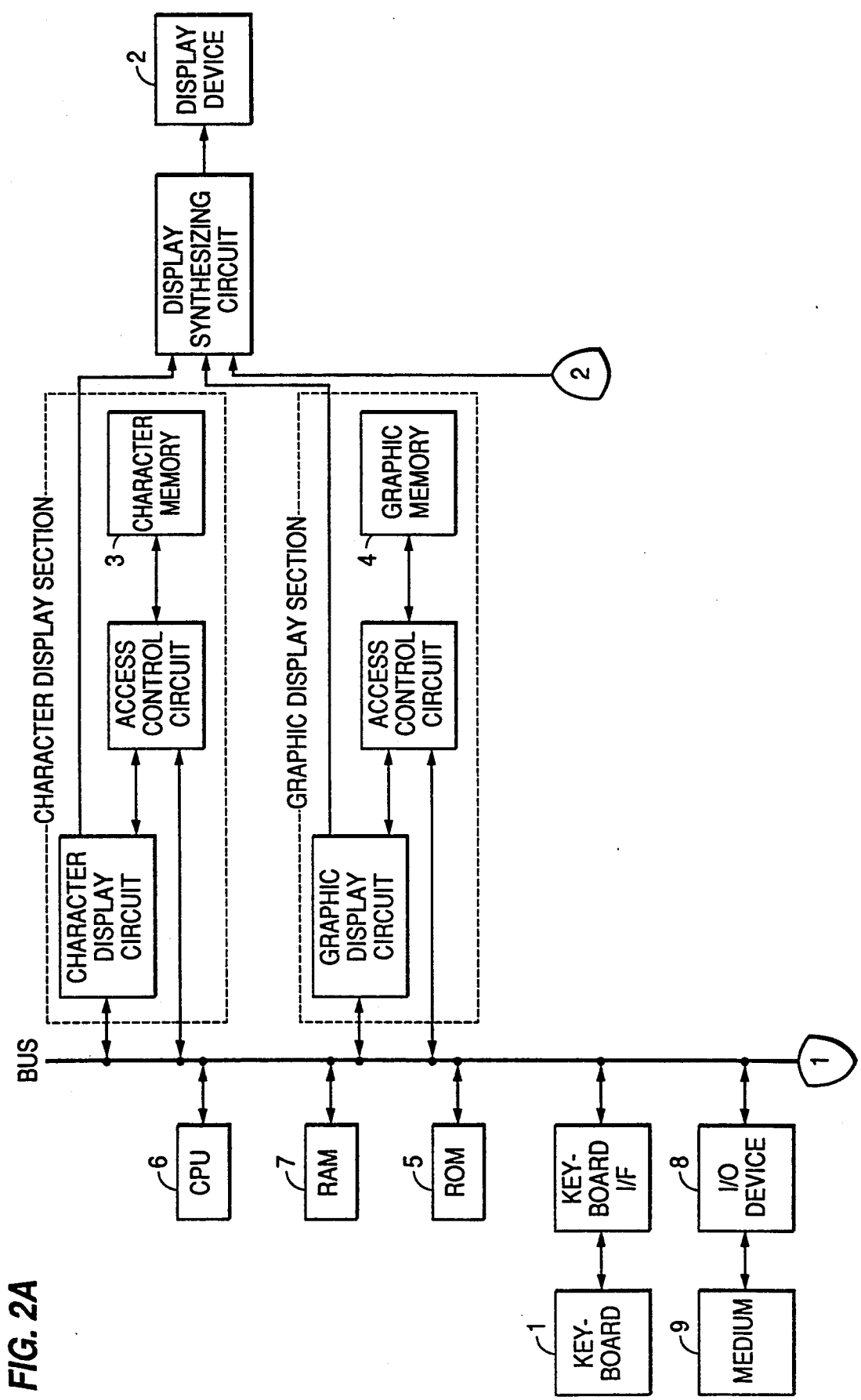
FIGS. 2A and 2B are block diagrams showing one example of a machining simulation system according to the present invention.
Figure 2B:
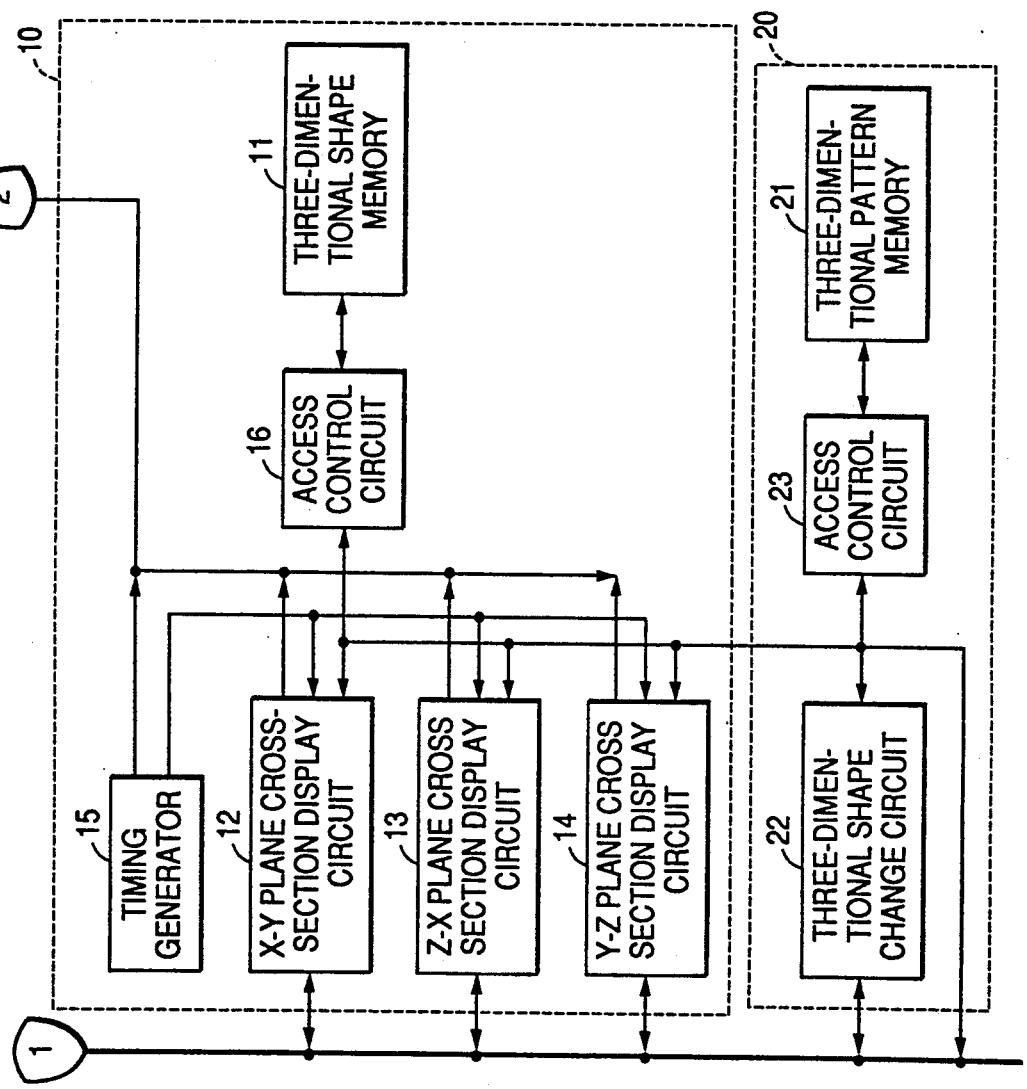

FIGS. 2A and 2B are block diagrams showing one example of a machining simulation system according to the present invention in correspondence to FIG. 1. The same components are marked with like symbols, and the explanations thereof will be omitted.

In the machining simulation system according to the present invention, a three-dimensional shape display section 10 and a three-dimensional shape change section 20 are added to the conventional system.

(1) Three-Dimensional Shape Display Section 10

Figure 3:
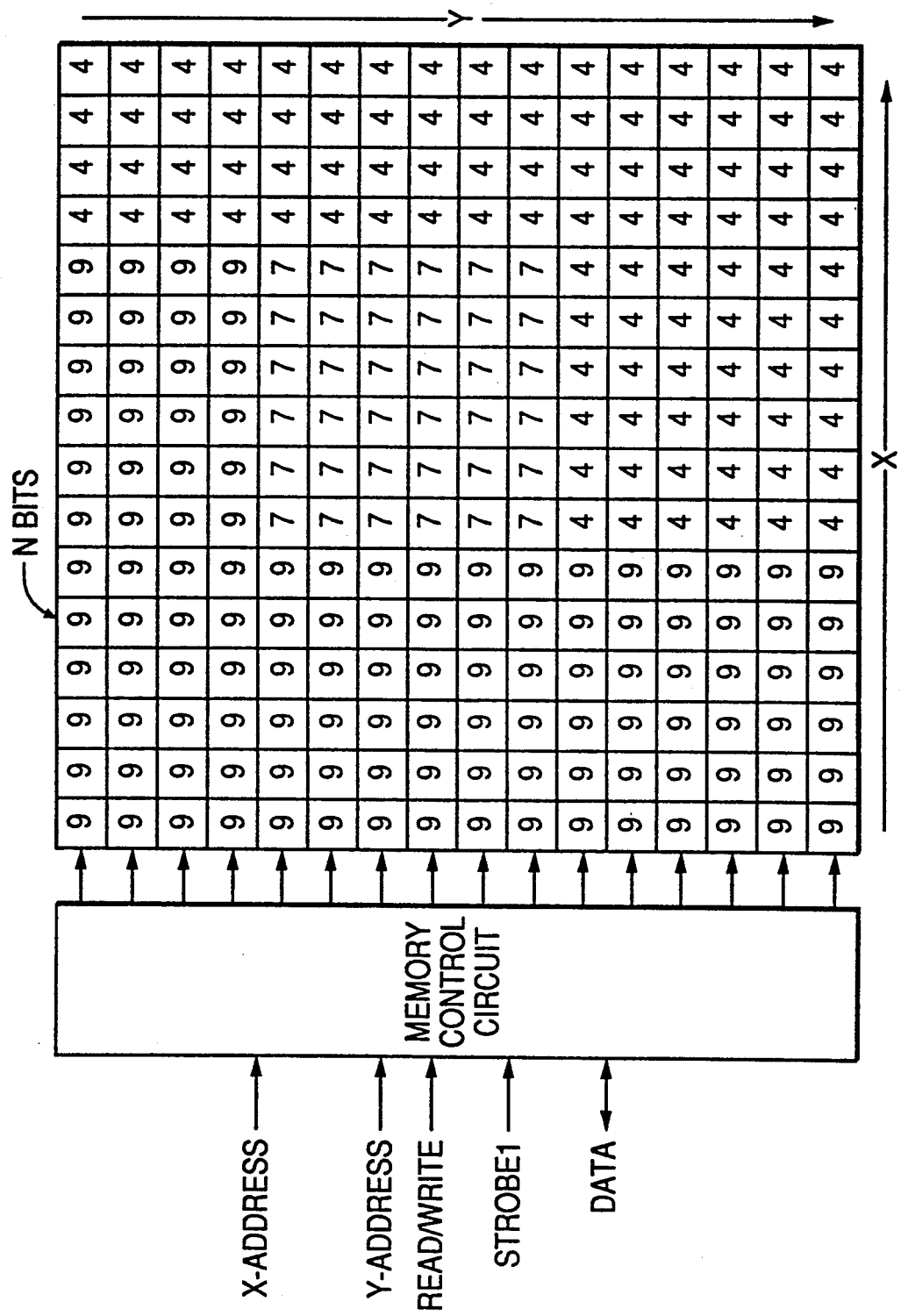
FIG. 3 is a structural view showing one example of a three-dimensional shape memory of the system according to the present invention.
Figure 4:
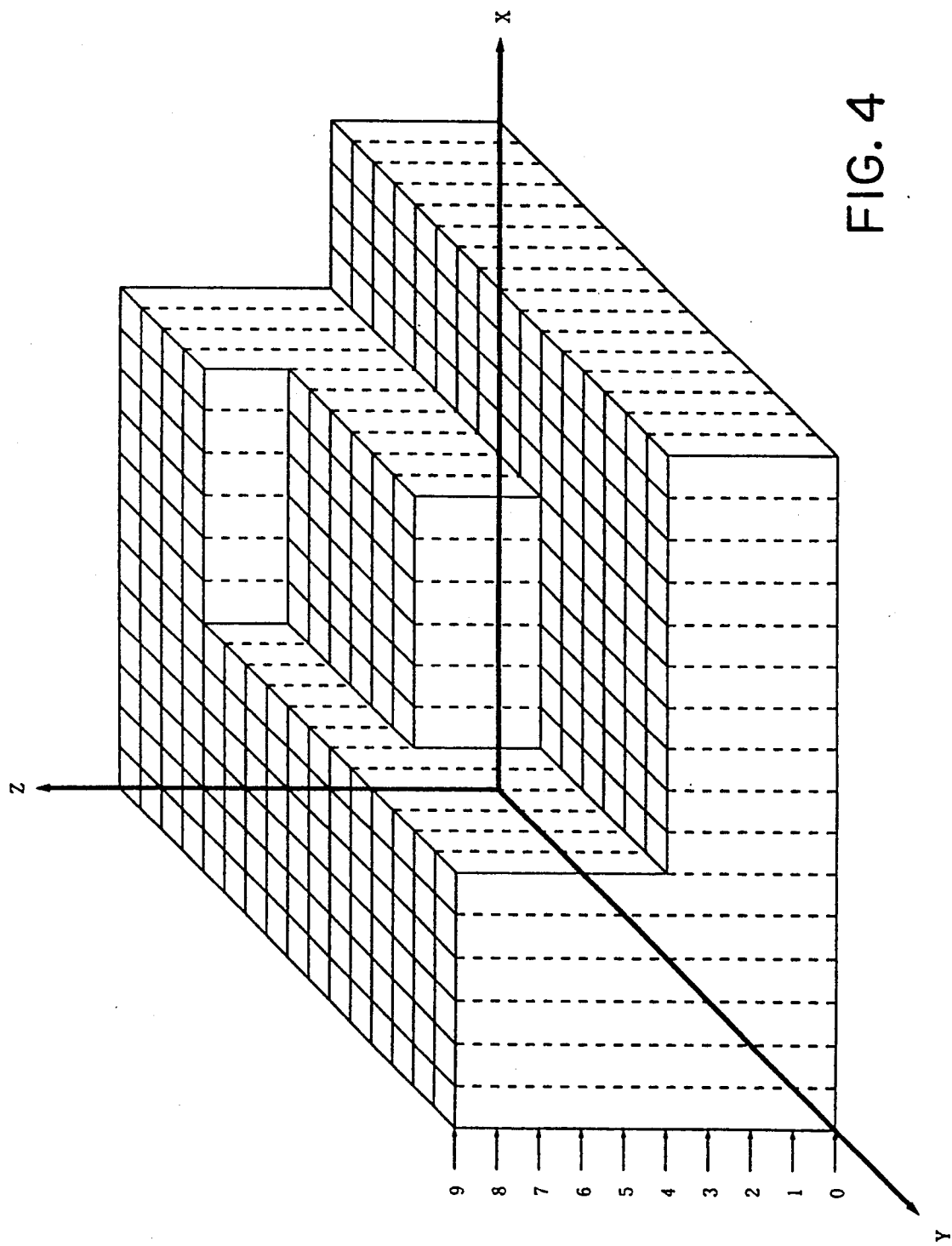
FIG. 4 is a perspective view showing one example of a material shape expressed by the three-dimensional shape memory illustrated in FIG. 3.

A three-dimensional shape memory 11 is a memory for storing a material shape, and its structure is illustrated in FIG. 3. The three-dimensional shape memory 11 expresses the shape by storing a Z-directional height on the storage unit specified by an X-address and a Y-address. The structure is similar to a typical Z-buffer memory in the field of computer graphics. FIG. 4 shows one example of the material shape expressed by the three-dimensional shape memory 11. The material shape is expressed in the form of blocks. The block units have to be made finer in order to secure a resolution sufficient for the machining simulation.

Figure 5A:
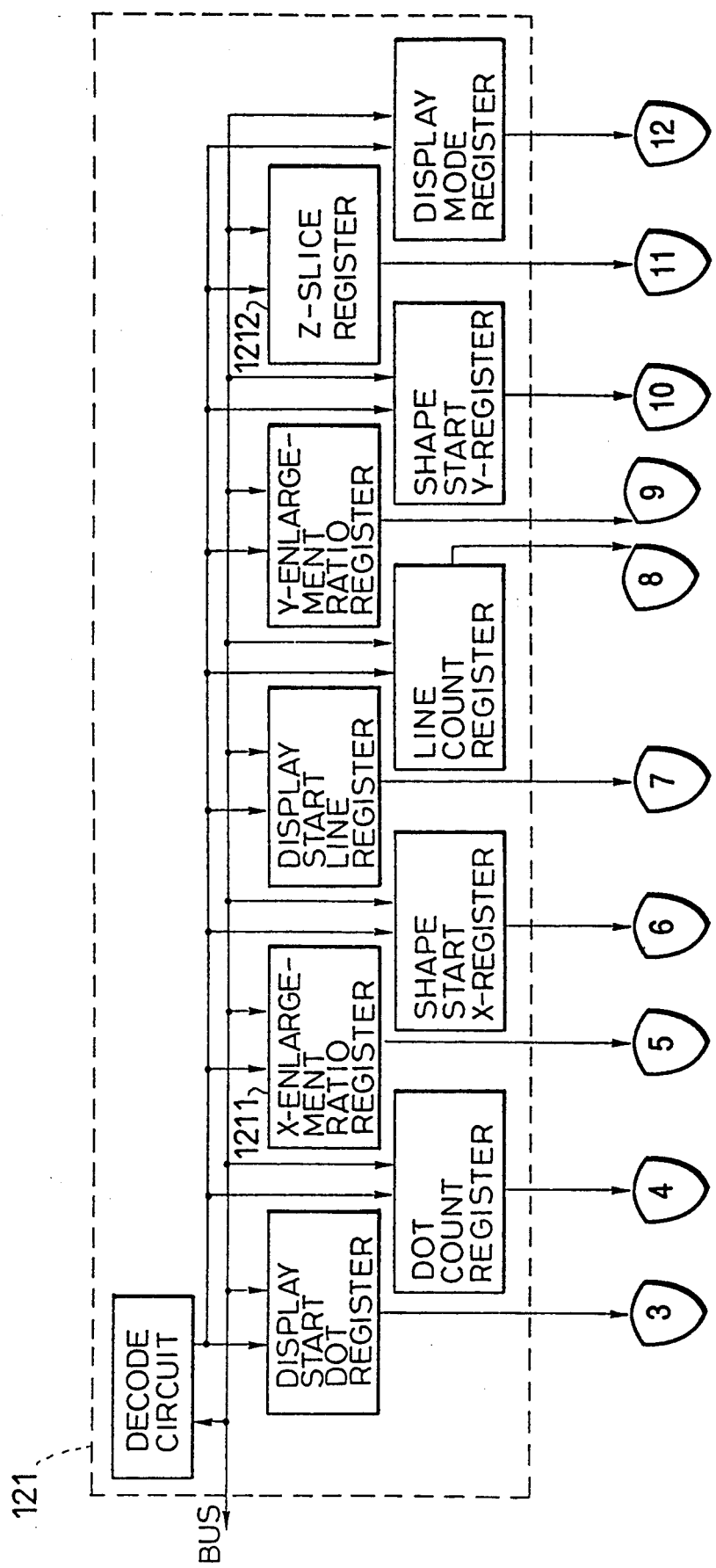
FIGS. 5A to 5C are block diagrams showing one example if an X-Y plane cross-section display circuit of the system according to the present invention.
Figure 5B:
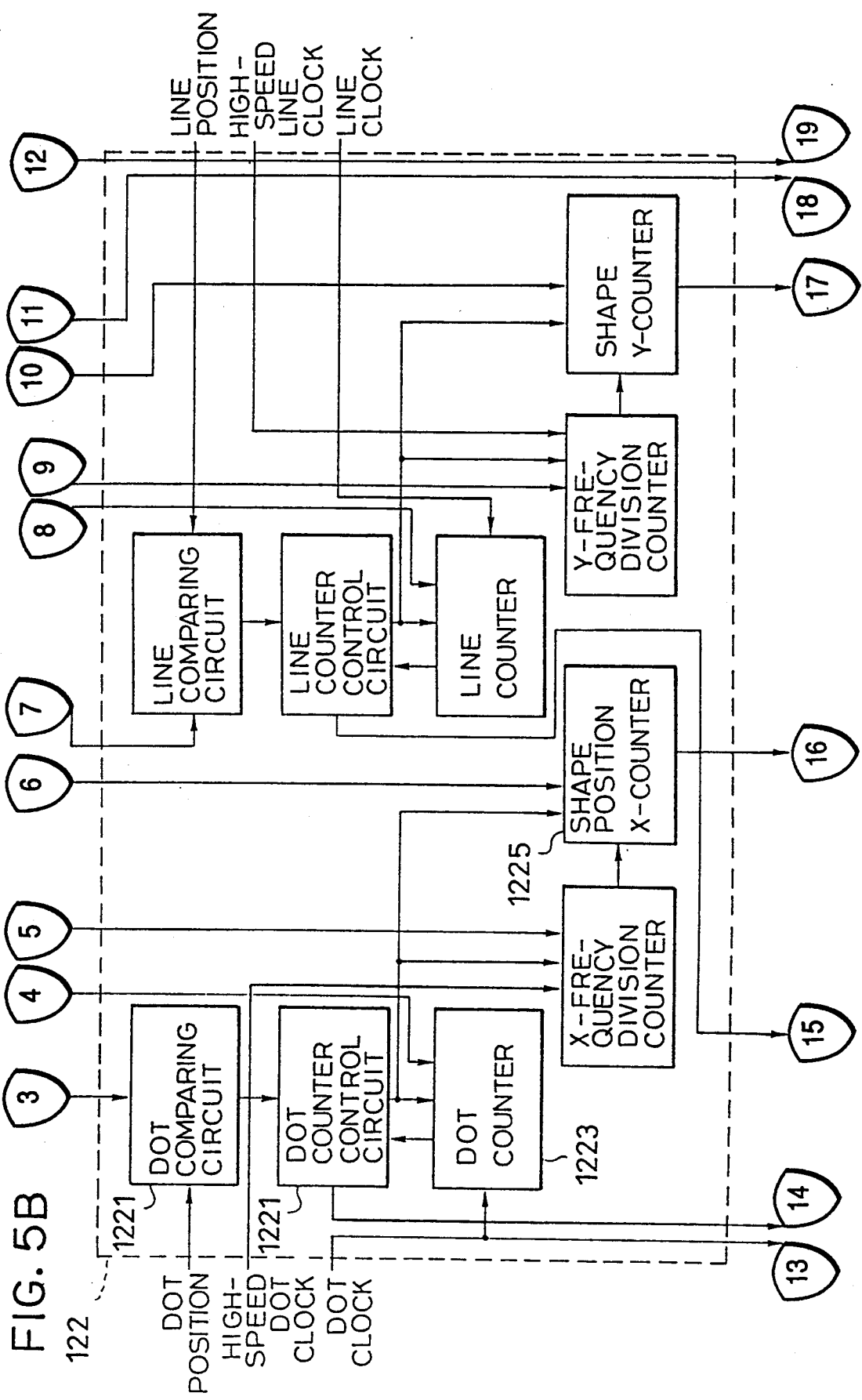
Figure 5C:
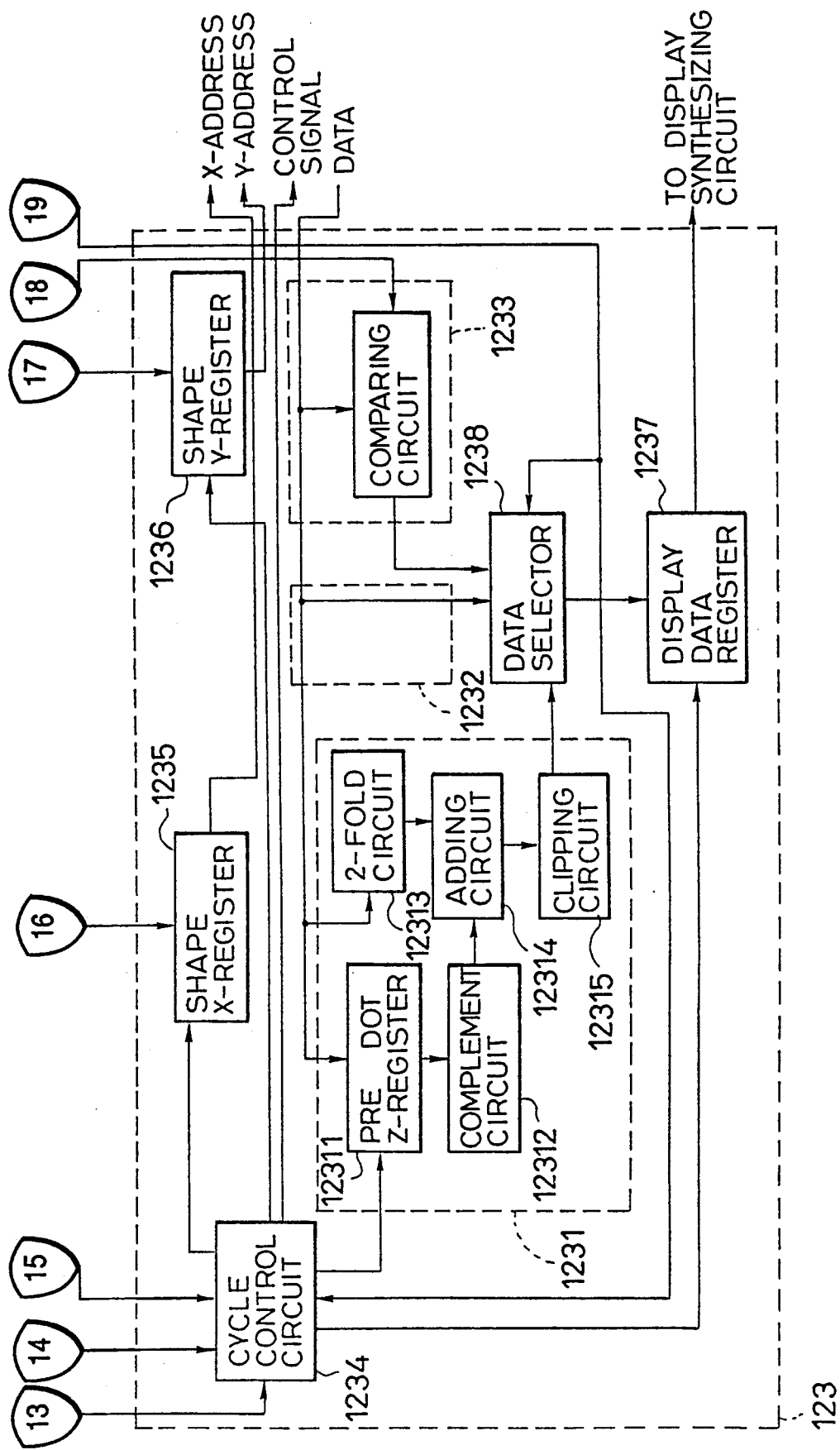

An X-Y plane cross-section display circuit 12 is a circuit for generating video signals of an X-Y plane cross-section in synchronization with scanning of the display device 2. FIGS. 5A to 5C are block diagrams thereof. The X-Y plane cross-section display circuit 12 is roughly composed of a mode register section 121, an address generation section 122 and a video signal generation section 123.

The mode register section 121 comprises a group of various registers for specifying operations of the display circuit. The mode register section 121 is settable from a CPU 6 via a bus. FIG. 6 shows correspondences of the display operations to contents of the register group.

The address generation section 122 is a circuit for generating the X- and Y-addresses of the three-dimensional shape memory 11 which are to be read in synchronization with scanning of the display device 2. The address generation section 122 is constructed of a dot system counter, a line system counter, an X-system counter and a Y-system counter. Among these counters, the dot system counter and the line system counter are intended to count a scanning area of the display device 2, while the X- and Y-system counters serve to count the address of the three-dimensional shape memory 11.

Operations of the dot system and X-system counters will be explained. When a dot position signal from a timing control circuit reaches a display start dot position (C) shown in FIG. 6, a dot comparing circuit 1221 is started, thereby starting the counting operation. The dot counter control circuit 1222, upon receiving the trigger signal, transmits load signals to a dot counter 1223, an X-frequency division counter 1224 and a shape X-counter 1225. The dot counter control circuit 1222 then loads an initial value from the mode register section 121. Further, during a period of a display window indicated by a dotted line (C) in FIG. 6, i.e., the period from a receipt of the trigger signal to a timing at which the dot counter becomes "0", intra dot window signals are continuously transmitted to a cycle control circuit

1234. Further, during this period, count enabling signals are continuously transmitted to the dot counter 1223, the X-frequency division counter 1224 and the shape X-counter 1225. The counting operation thus continues.

The dot counter 1223 is defined as a down counter for counting dot clocks. The dot counter 1223 transmits a count end signal to the dot counter control circuit 1222 when the count values becomes "0".

The X-frequency division counter 1224 is a counter for dividing a frequency of the high-speed dot clock in accordance with an X-enlargement ratio register 1211. Supposing that an X-enlargement ratio register set value is set to "8", the X-frequency division counter 1224 outputs divided-by-8 frequency clocks. The high-speed dot clocks have frequencies multiplied by integers of the dot clock. If it has a 8-fold frequency, and when the X-enlargement ratio set value is set to "8", it follows that the X-frequency division counter 1224 outputs a clock having the same frequency as that of the dot clock.

The shape X-counter 1225 is defined as an up counter for counting in accordance with an output of the X-frequency division counter 1224. If counted with a frequency which is twice as high as the dot clock, the display is reduced by a factor of 2 in the direction X. Whereas if counted with a ½ frequency, 2-fold enlarged display is provided.

The operations of the line system counter and the Y-system counter are the same as the dot system counter and the X-system counter operations, and the explanation thereof will be therefore omitted.

The video signal generation section 123 is a circuit for generating video signals with the aid of an arithmetic circuit on the basis of the X- and Y-addresses. The generation of the video signals has three modes of a highlighting luminance modulation circuit 1231, a luminance modulation circuit 1232 and a slice circuit 1233. The modes are specified by a display mode register. The cycle control circuit 1234 is a circuit for effecting both read control of the three-dimensional shape memory 11 and arithmetic control of the video signals. The cycle control circuit 1234 functions only when both of an intra dot window signal and an intra line window signal are effective. FIGS. 7A to 7H are time charts of assistance in explaining the operation cycle.

A display cycle 1 is a cycle for an initial execution when the intra dot window signal arrives. Performed is the read from the three-dimensional shape memory 11 after latching a shape X-register 1235 and a shape Y-register 1236. A display data register 1237 is latched after establishing an arithmetic circuit output of the display data, and the video signal is then outputted. Thereafter, the data read to a pre dot Z-register 12311 are latched preparatory to highlight display. A display cycle 2 is a cycle for a repetitive execution till the intra dot window signals are cut off after the display cycle 1. A difference from the display cycle 1 is that the shape Y-register 1236 is not latched. During scale-down display, since counting advances with the high-speed line clocks, if the shape Y-register 1236 is latched at this cycle, the same Y-address is not attained, and there is a possibility that the display will slightly obliquely deviate.

Figure 8:
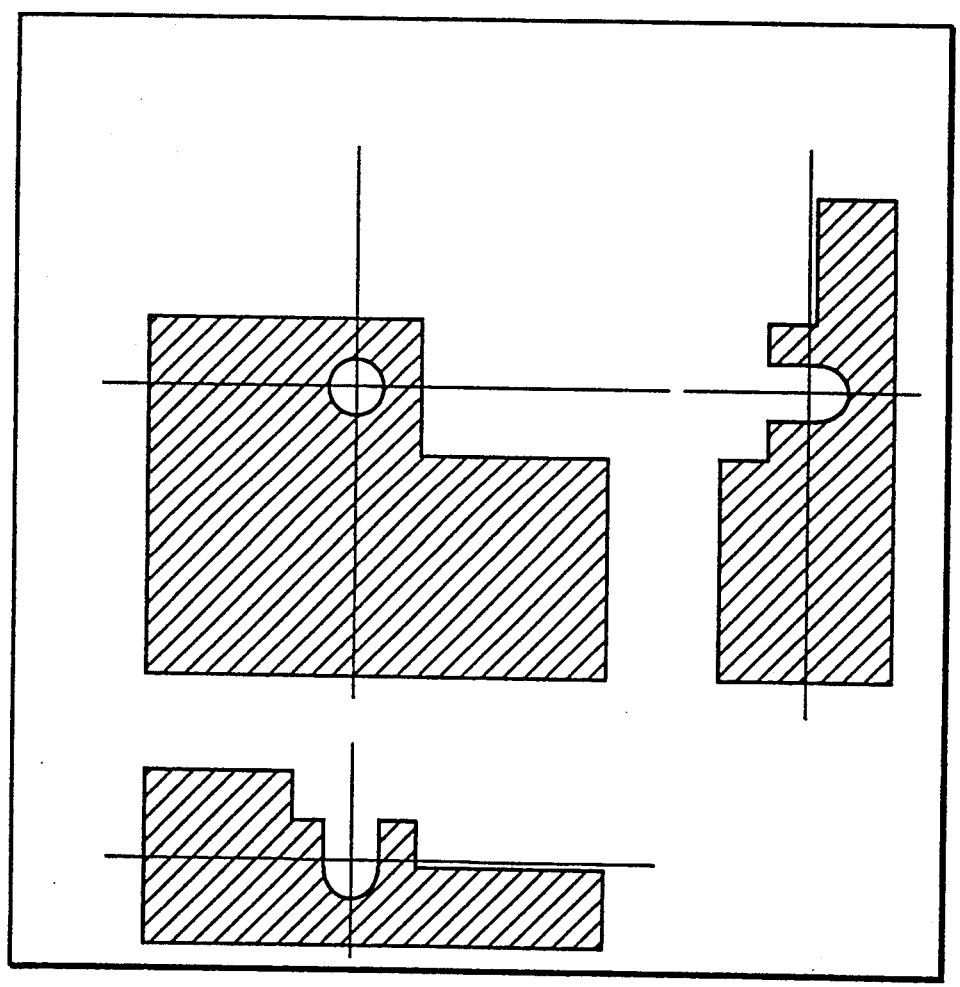
FIG. 8 is a diagram showing a display example of the video signal generation section of the X-Y plane cross-section display circuit illustrated in FIGS. 5A to 5C.

An idle status is conceived as a signal status when the cycle control circuit 1234 is not operated. The display data register 1237 and the pre dot Z-register 12311 are 0-cleared. The slice circuit 1233 compares the data read from the three-dimensional shape memory 11 with that of the Z-slice register 1212. If the read data is larger than or equal to the latter, the slice circuit 1233 outputs "1" or "0" as display data. FIG. 8 shows a display example. The luminance modulation circuit 1232 is a circuit for creating a cubic effect by changing a luminance in accordance with a Z-directional depth.

The highlighting luminance modulation circuit 1231 is a circuit for creating more cubic effects by overlapping a differential of the Z-directional depth in the scanning direction with a luminance modulation and giving a highlight and a shadow. $D = Zb - (Za - Zb)$, and namely, $D = 2 \times Zb - Za$, where "Zb" is the read data, "Za" is the pre dot Z-register 12311, and "D" is the display data. This arithmetic operation is executed by use of a complement circuit 12312, a 2-fold circuit 12313 and an adding circuit 12314. Note that as a result of the arithmetic operation, "D" probably exceeds an effective range of the display data and is therefore rounded off by a clipping circuit 12315.

Figure 9:
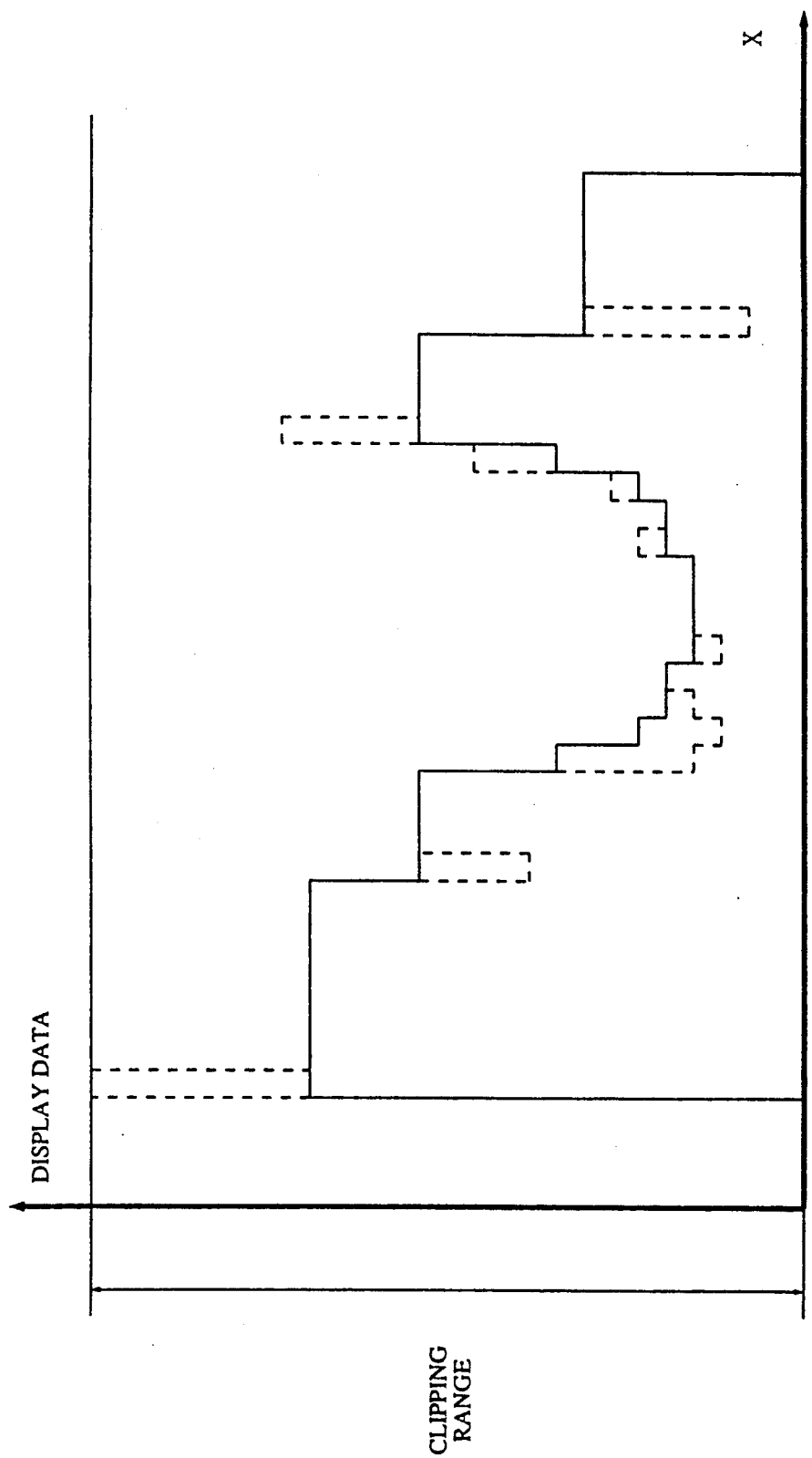
FIG. 9 is a diagram showing a relation between a luminance and a scanning direction of a highlighting luminance modulation circuit of the X-Y plane cross-section display circuit illustrated in FIGS. 5A to 5C.
Figure 10:
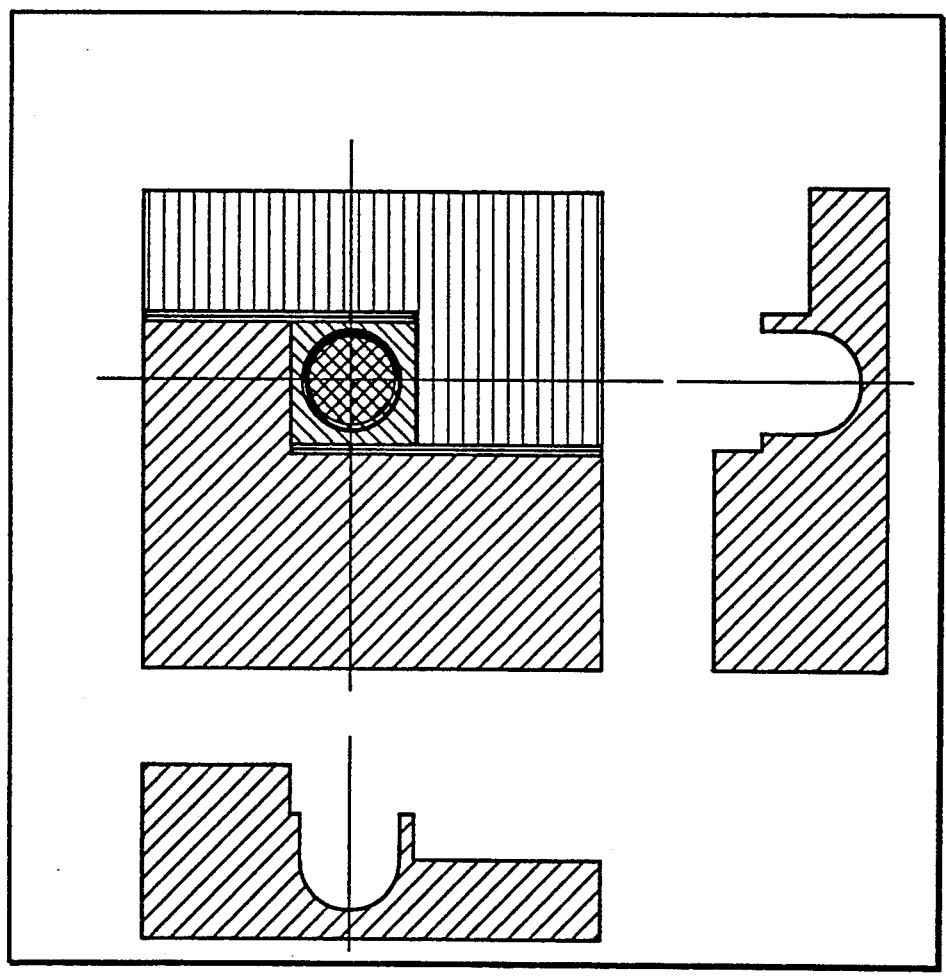
FIG. 10 is a diagram showing a display example of the highlighting luminance modulation circuit of the X-Y plane cross-section display circuit depicted in FIGS. 5A to 5C.

A data selector 1238 selects a piece of data from the display data calculated by these circuits, and the selected data is inputted to the display data register 1237. A relation between the scanning direction (X) of the highlighting luminance modulation circuit and the luminance (display data) is demonstrated by FIG. 9. FIG. 10 shows a display example.

Figure 11A:
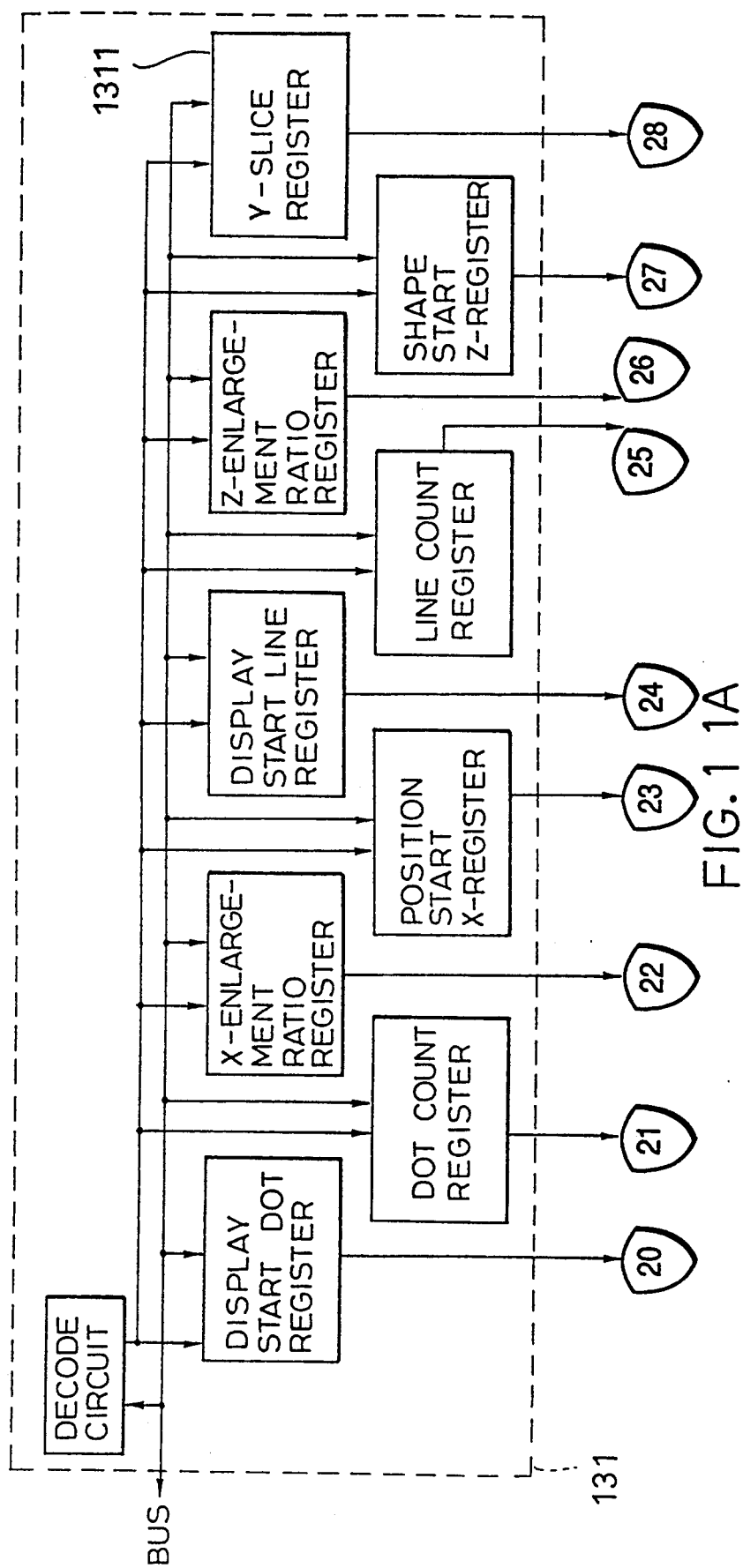
FIGS. 11A to 11C are block diagrams showing one example of a Z-X plane cross-section display circuit of the system according to the present invention.
Figure 11B:
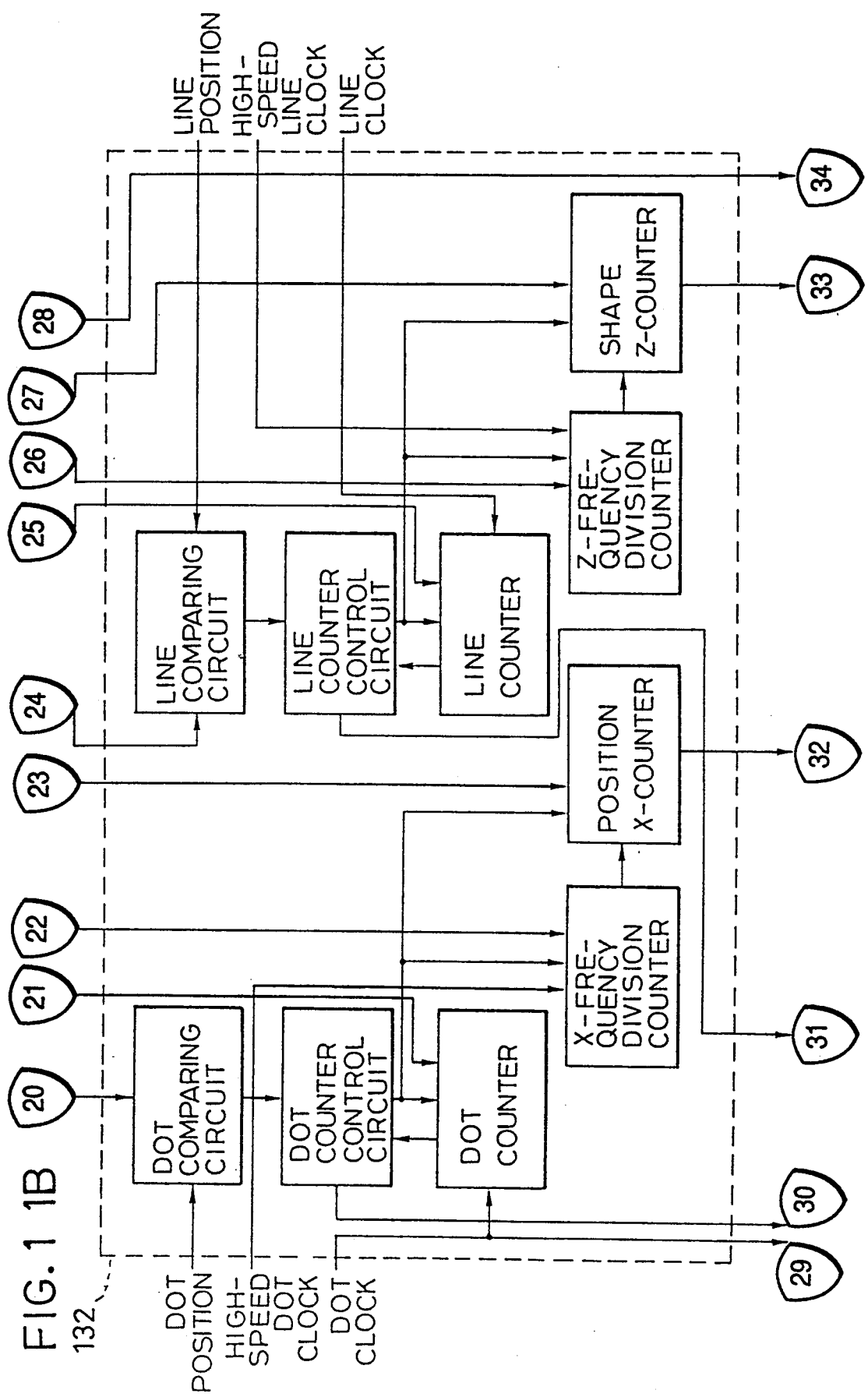
Figure 11C:
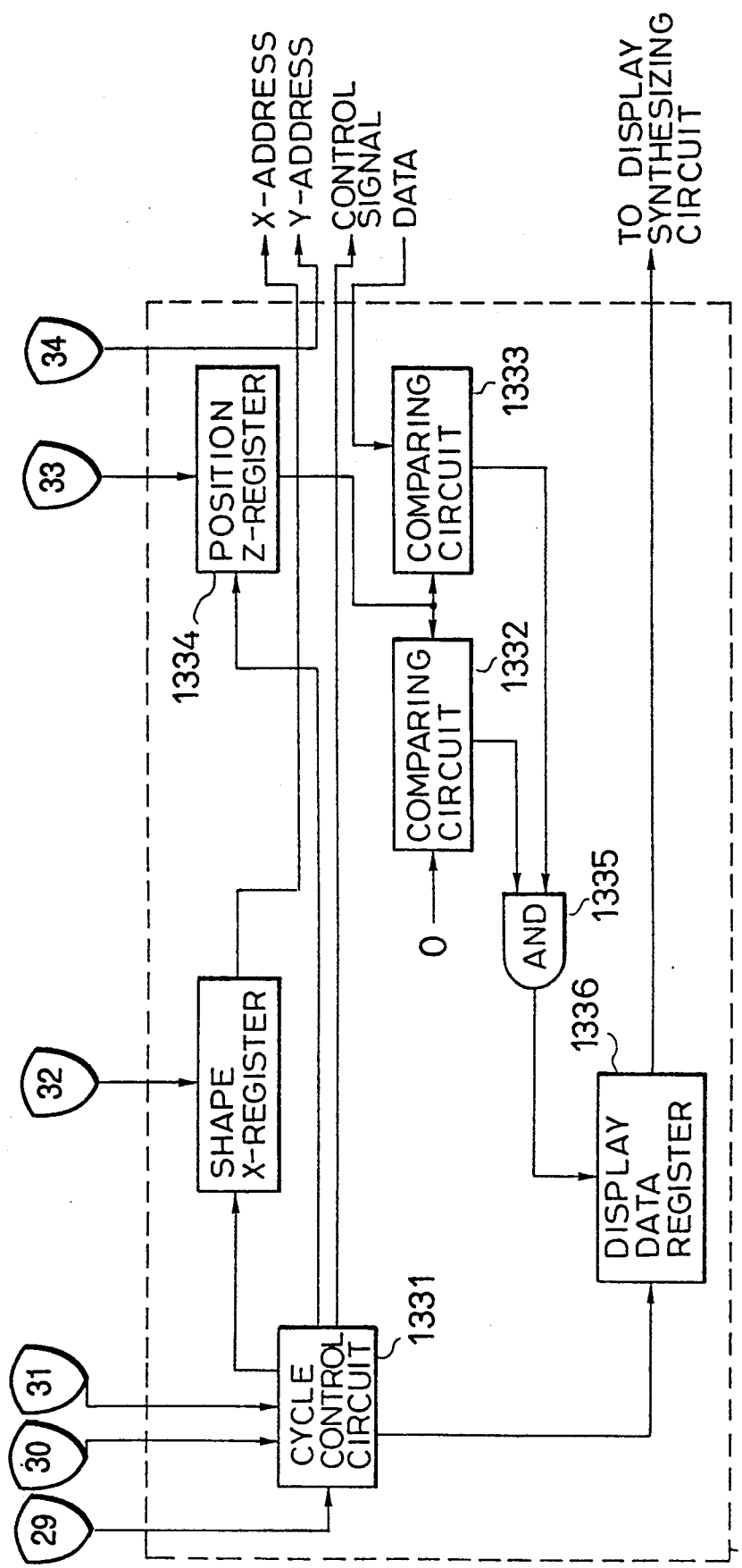
Figure 12:
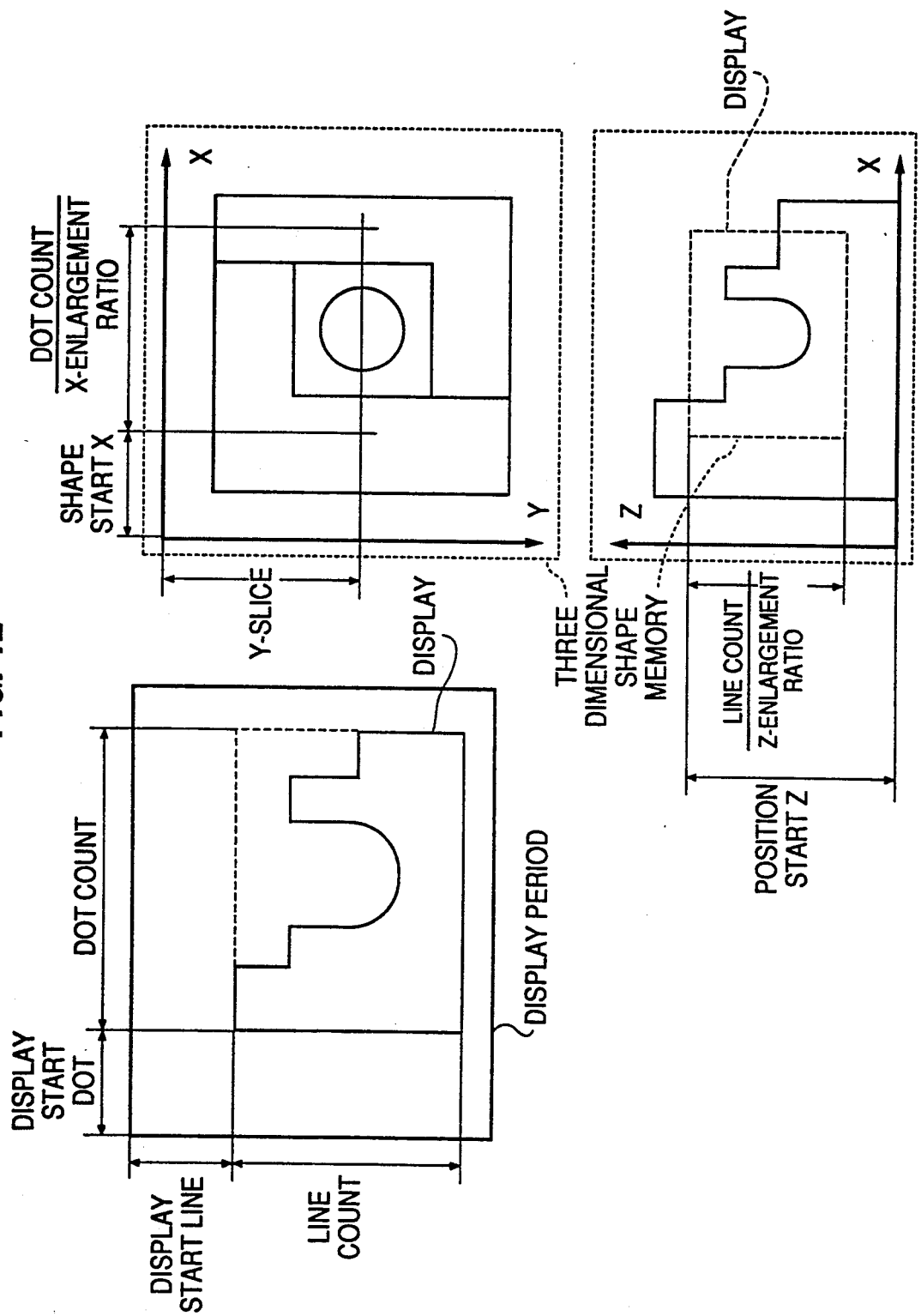
FIG. 12 is a diagram showing correspondences of display operations to contents of the Z-X plane cross-section display circuit illustrated in FIGS. 11A to 11C.

The Z-X plane cross-section display circuit 13 is a circuit for generating a video signal of the Z-X plane cross-section similarly in synchronization with scanning of the display device 2. FIGS. 11A to 11C are block diagrams thereof. The Z-X plane cross-section display circuit 13 is also roughly composed of a mode register section 131, an address generation section 132 and a video signal generation section 133. The mode register section 131 and the address generation section 132 have a construction similar to the X-Y plane cross-section display circuit 12. FIG. 12 shows correspondences of display operations to contents of the register group.

The address generation section 132 comprises a dot system counter, a line system counter, an X-system counter and a Z-system counter. Among these counters, the dot system counter and the line system counter are intended to count a scanning range of the display device 2; the X-system counter serves to count the address of the three-dimensional shape memory 11; and the Z-system counter counts the Z-directional position.

The operations of the dot system counter and the X-system counter are the same with the X-Y plane cross-section display circuit 12, and hence the explanation thereof will be omitted. The operations of the line system counter and the Z-system counter are the same with the X-Y plane cross-section display circuit 12 except that a position Z-counter is used as a down counter.

The video signal generation section 133 has a construction similar to that of the X-Y plane cross-section display circuit 12. In a Z-X plane cross-section display circuit 13, only slice display is provided. FIGS. 13A to 13F are time charts of assistance in explaining the operation of a cycle control circuit 1331. Only slice display is effected on the Z-X plane, so that the operation is the same with the X-Y plane cross section display circuit 12, excepting that a necessity for the control of the pre dot Z-register is eliminated. Note that a value of a Y-slice register 1311 is outputted to the Y-address of the three-dimensional shape memory 11.

A comparing circuit 1332 is a circuit for comparing the position Z-register with "0" and, if not less than "0", outputting "1". The comparing circuit 1332 judges a bottom of the cross-section. A comparing circuit 1333 is a circuit for comparing a position Z-register 1334 with the read data from the three-dimensional shape memory 11 and, if the position Z-register 1334 is not more than the read data, outputting "1". The comparing circuit 1333 judges a top of the cross-section. These outputs are inputted via an AND circuit 1335 to a display data register 1336.

Figure 14A:
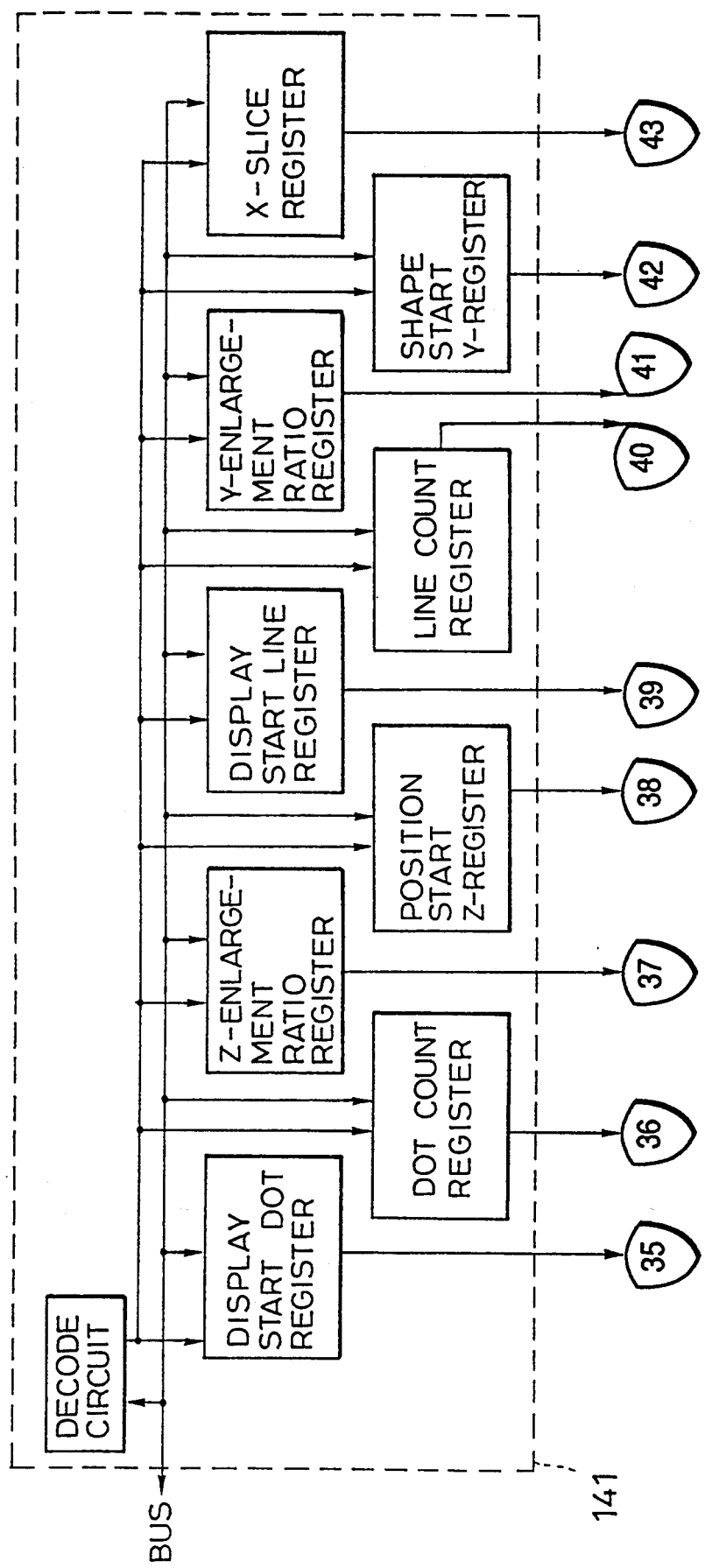
FIGS. 14A to 14C are block diagrams showing one example of a Y-Z plane cross-section display circuit of the system according to the present invention.
Figure 14B:
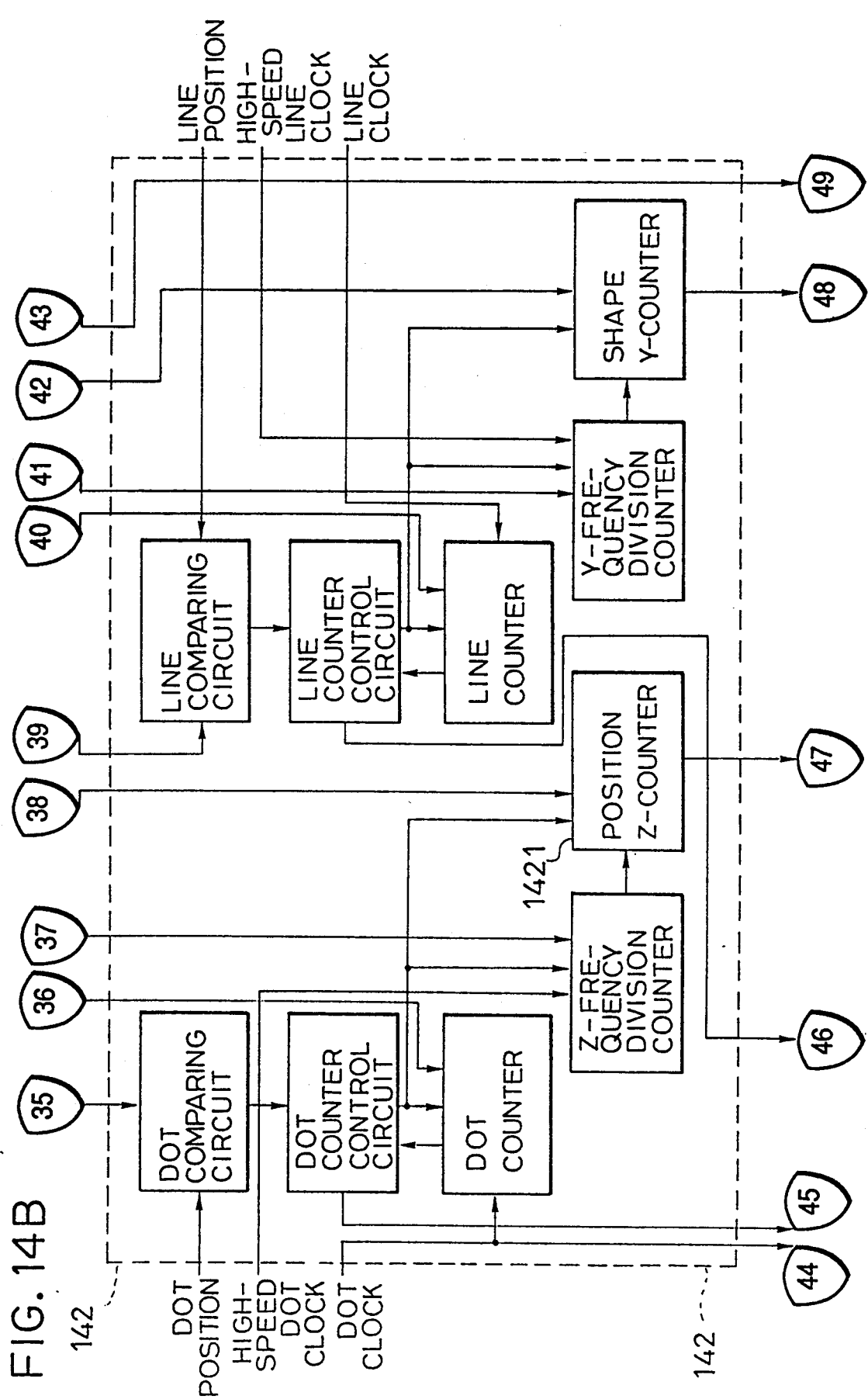
Figure 14C:
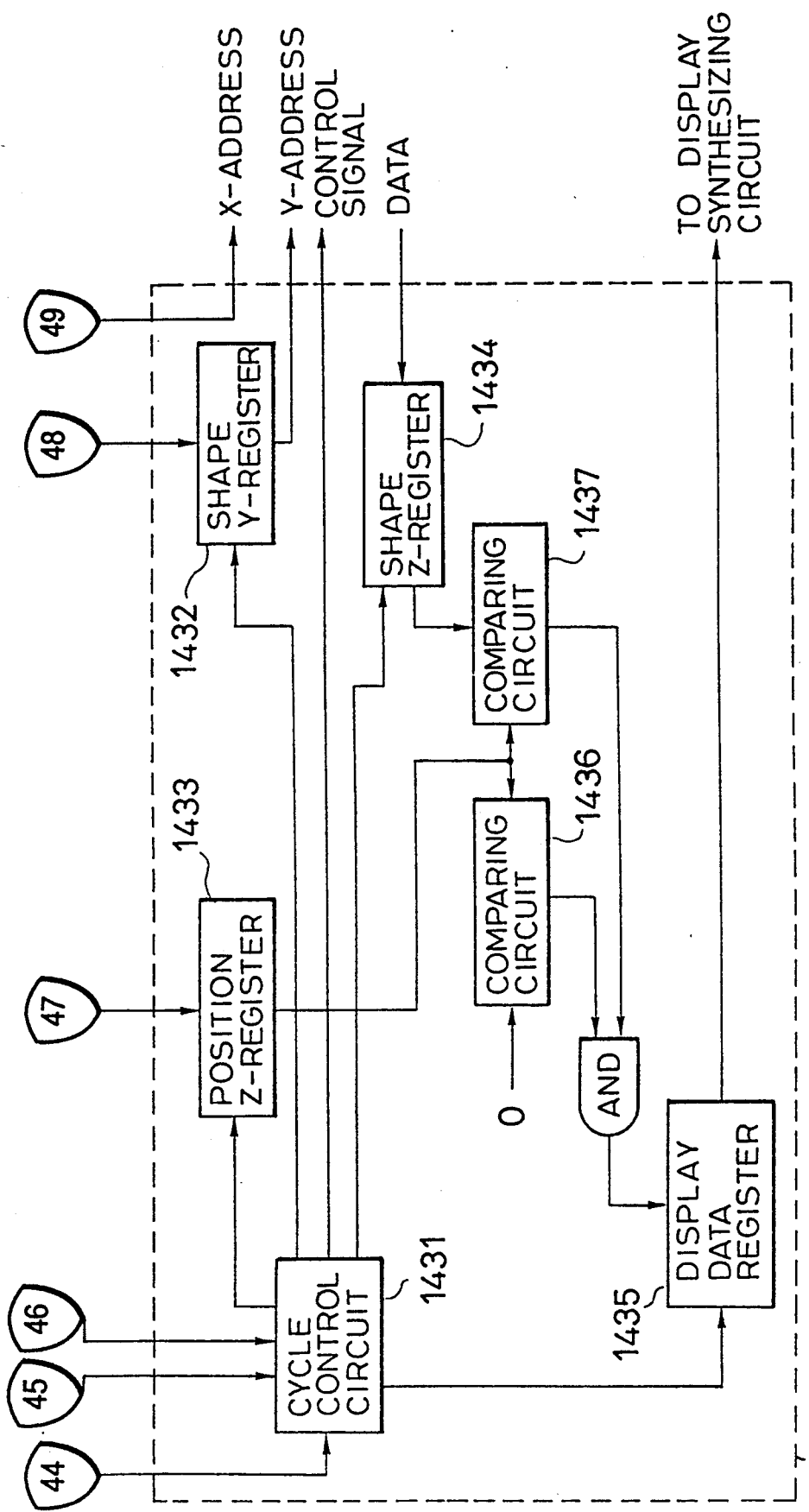

A Y-Z plane cross-section display circuit 14 is a circuit for generating a video signal of a Y-Z plane cross-section similarly in synchronization with scanning of the display device 2. FIGS. 14A to 14C are block diagrams thereof. The Y-Z plane cross-section display circuit 14 also has a construction similar to the Z-X plane cross-section display circuit 13. FIG. 15 shows correspondences of display operations to contents of a mode register section 141.

An address generation section 142 comprises a dot system counter, a line system counter, a Z-system counter and a Y-system counter. Among these counters, the dot system counter and the line system counter are intended to count a scanning range of the display device 2; the Z-system counter serves to count the Z-directional position; and the Y-system counter counts the address of the three-dimensional shape memory 11.

The operations of the dot system, the Z-system line system counter and the Y-system counter are the same with the X-Y plane cross-section display circuit 12, and hence the descriptions thereof will be omitted. Note that a position Z-counter 1421 is also an up-counter with respect to the Y-Z plane.

A video signal generation section 143 will be explained. FIGS. 16A to 16G are time charts of assistance in explaining the operation of a cycle control circuit 1431. A display cycle 1 is a cycle for an initial execution when the intra dot window signal arrives. Performed is the read from the three-dimensional shape memory 11 after latching a shape Y-register 1432 and a position Z-register 1433. The read data are latched in a shape Z-register 1434. Thereafter, the video signal is outputted by latching a display data register 1435 after establishing an arithmetic circuit output of the display data.

A display cycle is a cycle for a repetitive execution till the intra dot window signals are cut off. A difference from the display cycle 1 is that no reading process from the three-dimensional shape memory 11 is effected.

An idle status is defined as a signal status during non-operation of the cycle control circuit. The display data register 1435 and the pre dot Z-register are 0-cleared. A comparing circuit 1436 is a circuit for comparing the position Z-register 1433 with "0" and, if not less than "0", outputting "1". The comparing circuit 1436 judges a bottom of the cross-section. A comparing circuit 1437 is a circuit for comparing the shape Z-register 1434 with the position Z-register 1433 and, if the position Z-register 1433 is not more than the shape Z-register 1433, outputting "1". The comparing circuit 1437 judges a top of the cross-section. These outputs are inputted via an AND circuit 1438 to the display data register 1435.

Figure 17:
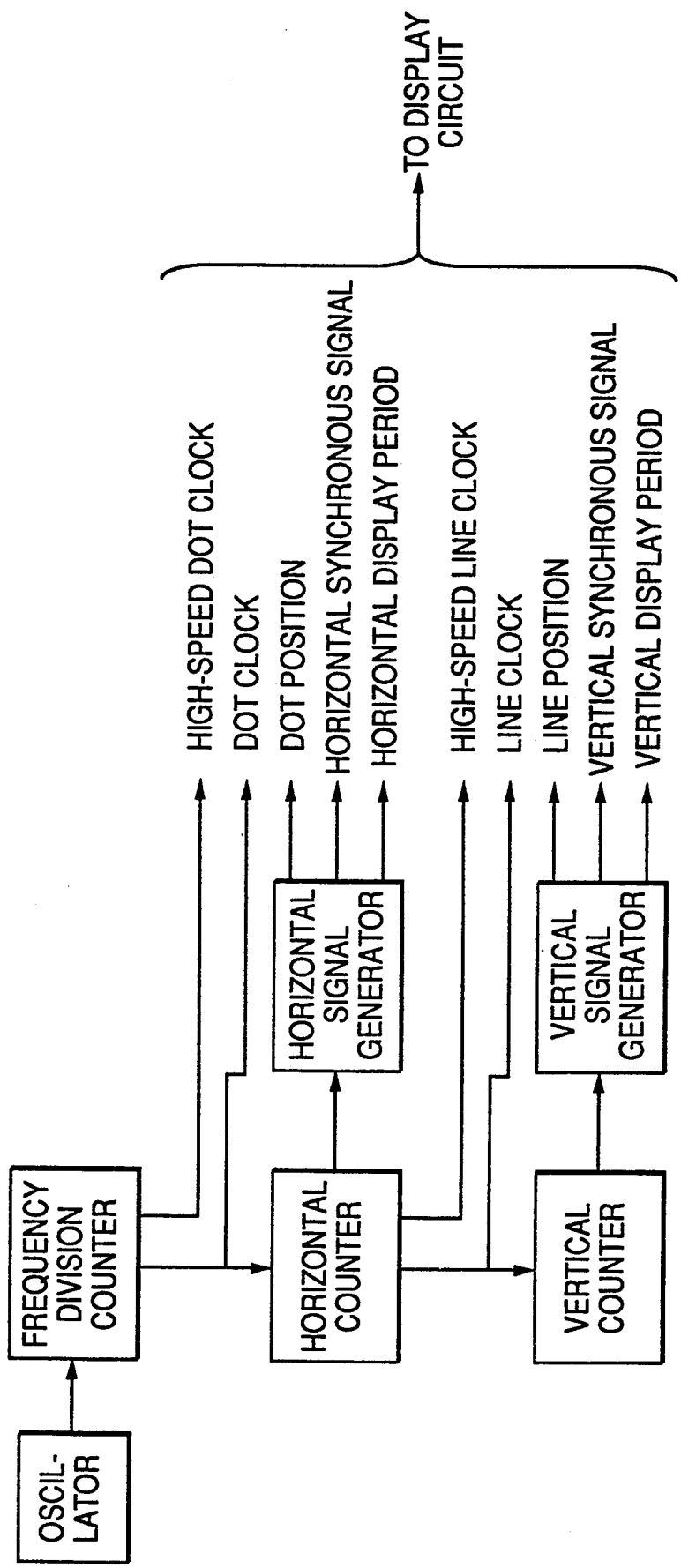
FIG. 17 is a block diagram showing one example of a timing generator of the system according to the present invention.
Figure 18:
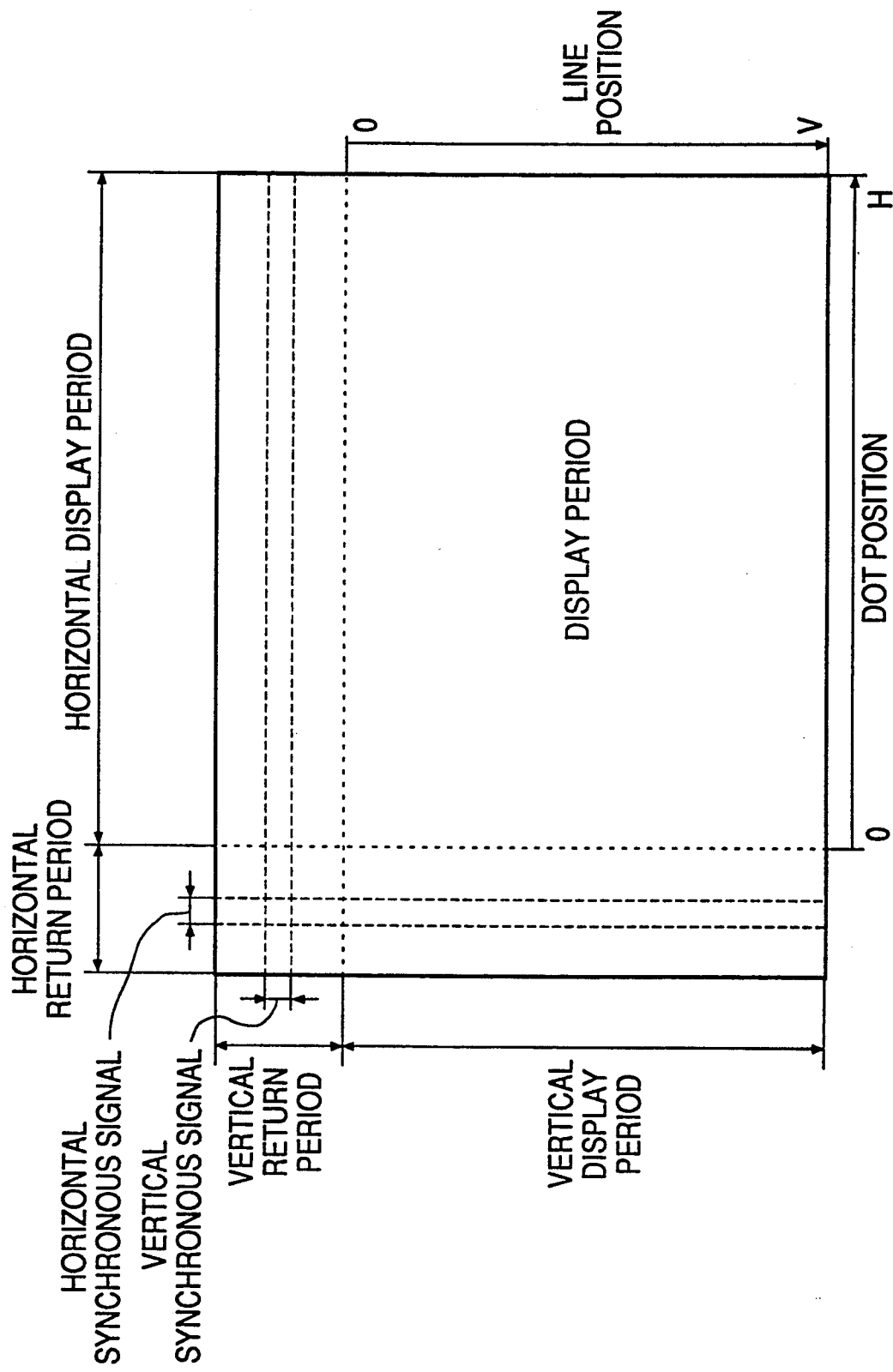
FIG. 18 is a diagram showing relations between scanning of the display device and a variety of signals.

A timing generator 15 in FIG. 2B is a circuit for generating a variety of signals in synchronization with scanning of the display device 2. The timing generator 15 supplies the signals to the X-Y plane cross-section display circuit 12, the Z-X plane cross-section display circuit 13, the Y-Z plane cross-section display circuit 14 and the display device 2. FIG. 17 is a block diagram illustrating the timing generator 15. FIG. 18 shows relations between scanning of the display device 2 and the various signals.

An access control circuit 16 is a circuit for arbitrating the access to the three-dimensional shape memory 11 from the cross-section display circuit or the like so as to avoid a conflict.

(2) Expansion of Three-Dimensional Shape Display Section 10

The following are explanations of methods of expanding the three-dimensional shape display section 10 and performing a color modulation, a pixel pattern modulation and display of a two-dimensional shape.

The color modulation will be explained.

The luminance modulation is to change the luminance of the display device 2 in accordance with a depth in the direction of a sight line. The color modulation is, however, intended to express the depth in terms of a saturation and a lightness of the display device 2. A construction is obtained by adding a typical color conversion table in the field of computer graphics to the output side of the display data register 1435 depicted in FIGS. 14A to 14C, wherein the video signals may be outputted while making arbitrary display colors corresponding to arbitrary display data values. In this case, if contents of the color conversion table are settable from the CPU 6, the colors can be changed over.

The pixel pattern modulation will be described.

The pixel pattern modulation is to change a density of pixels illuminated instead of the luminance in accordance with the depth of the sight line. The pixel pattern modulation is used mainly for a display device incapable of half-tone display. A construction can be obtained by providing a pixel pattern generator for generating the pixel patterns with a variety of densities corresponding to dot positions and line positions shown in FIG. 17, wherein an output of the display data register 1435 of FIGS. 14A to 14C is inputted as a changeover signal of the pixel pattern, and an output of the pixel pattern generator may be used a video signal.

The two-dimensional shape display will be explained.

Given in the machining simulation system illustrated in FIGS. 2A and 2B is the example where the three-dimensional shape is displayed. The Z-direction of the three-dimensional shape memory 11 is merely diminished down to 1 bit, whereby the two-dimensional shape is displayable. In this case, the cross-sections of the Z-X and Y-Z planes, and the luminance modulation of the X-Y plane are unnecessary.

(3) Three-Dimensional Shape Change Section 20

Figure 19:
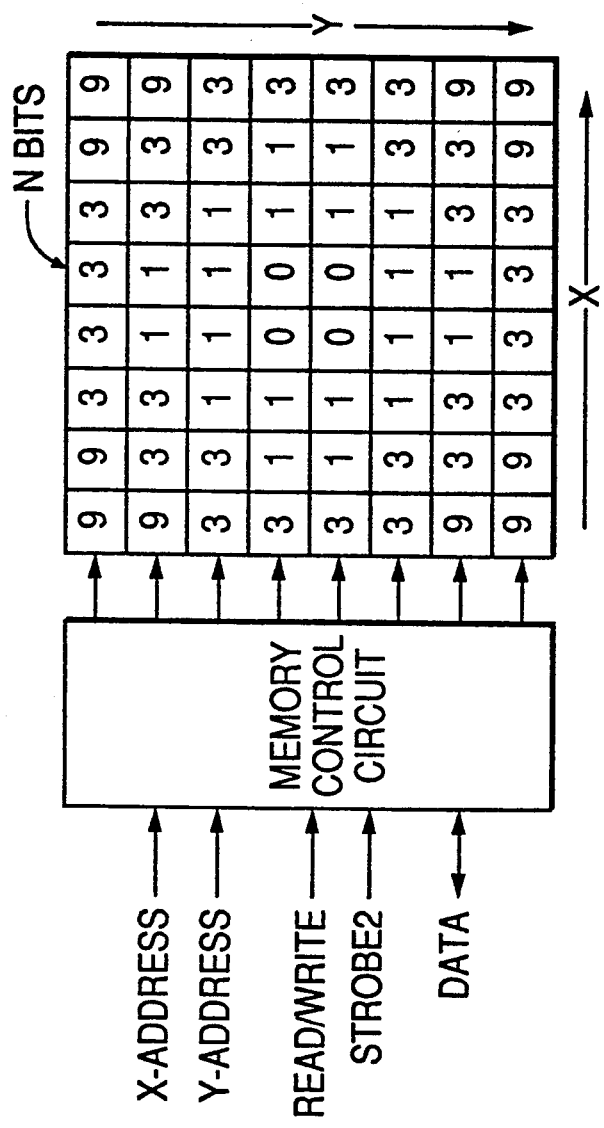
FIG. 19 is a structural diagram showing one example of a three-dimensional pattern memory of the system according to the present invention.
Figure 20B:
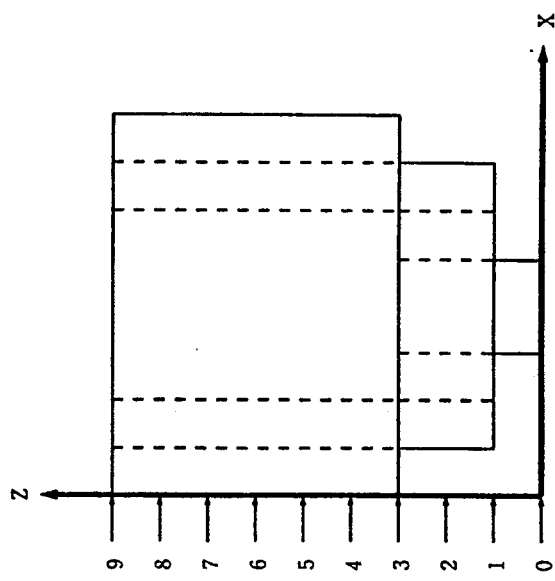
FIGS. 20A to 20C are perspective views showing one example of a tool shape expressed by the three-dimensional pattern memory illustrated in FIG. 19.
Figure 20C:
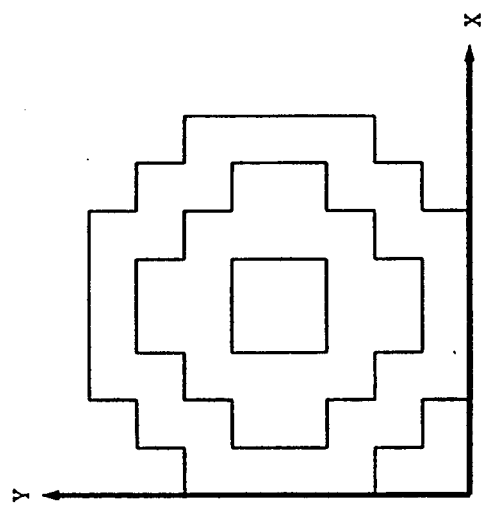
Figure 20A:
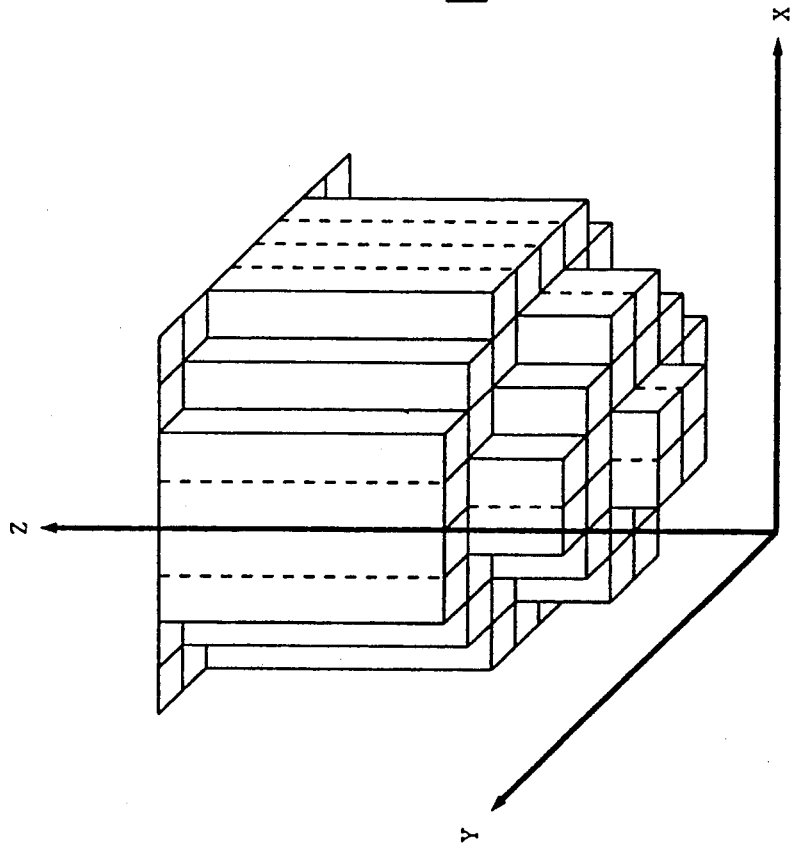

A three-dimensional pattern memory 21 in FIG. 2B is a memory for storing a shape of a tool and has the same structure as that of the three-dimensional shape memory 11. FIG. 19 illustrates the structure thereof. FIGS. 20A to 20C depict a tool shape expressed by the three-dimensional pattern memory 21.

A three-dimensional shape change circuit 22 serves to change material shape when the tool shape is intruded in the material shape by scanning the three-dimensional shape memory 11 and the three-dimensional pattern memory 21 as well.

Figure 21A:
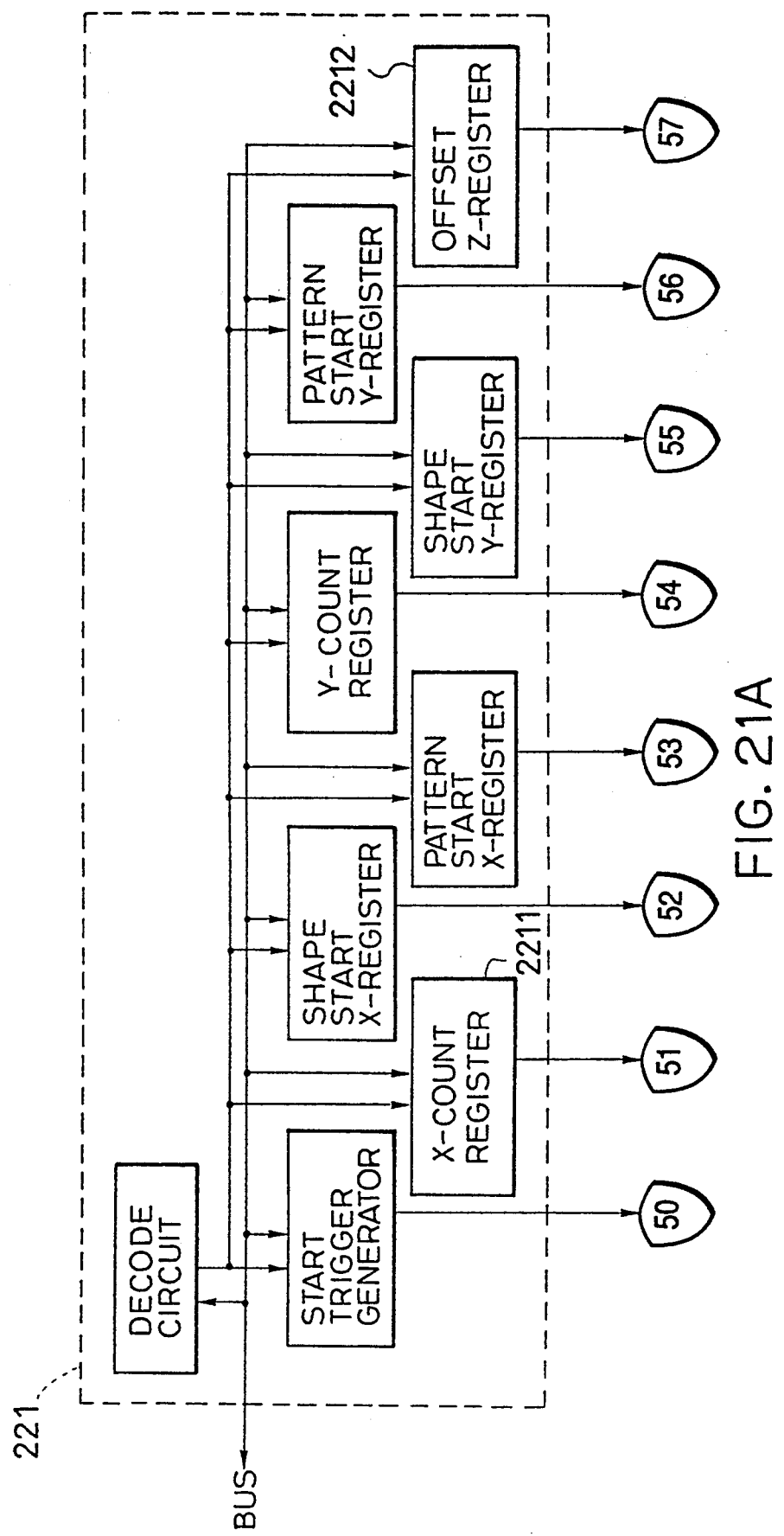
FIGS. 21A to 21C are block diagrams showing one example of a three-dimensional shape change circuit of the system according to the present invention.
Figure 21B:
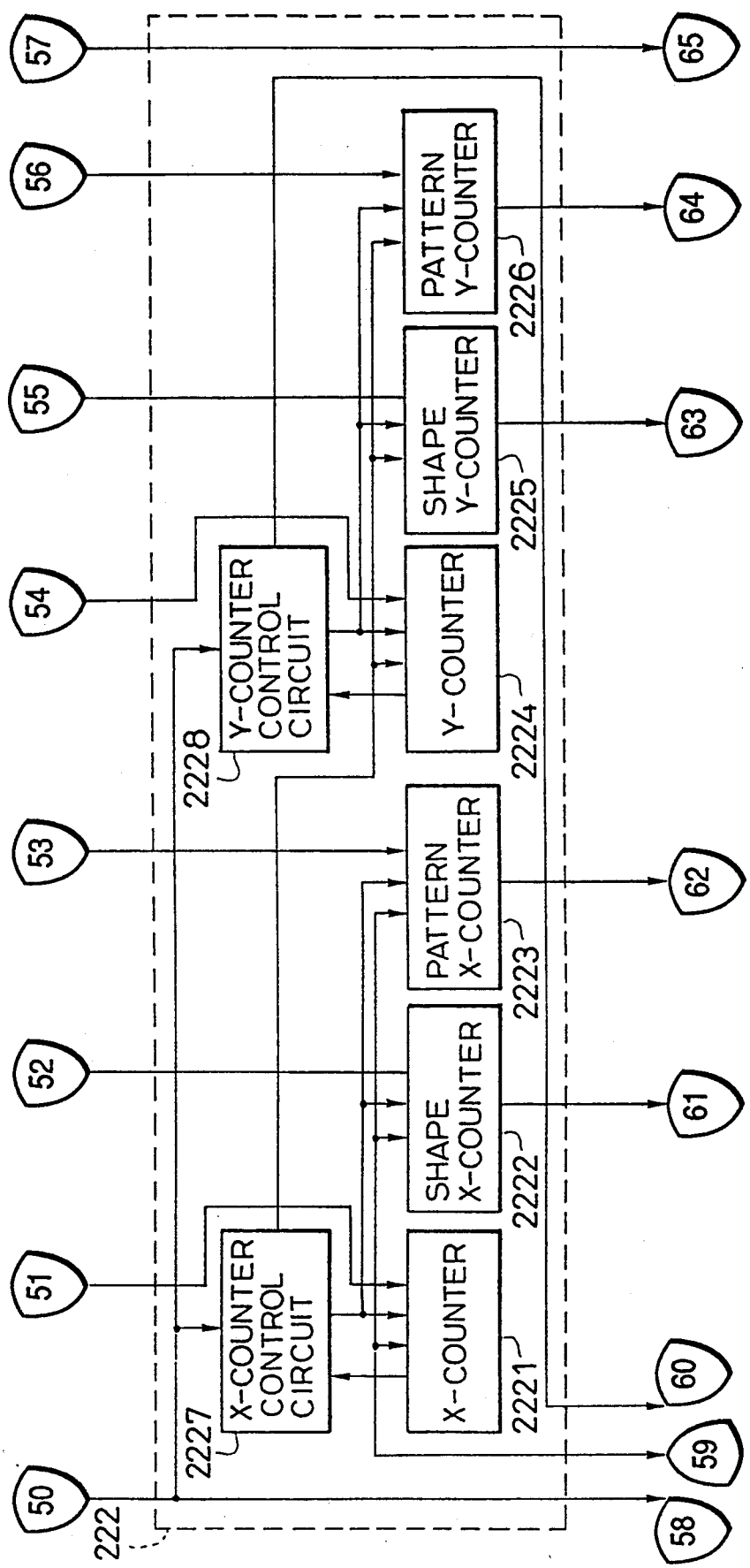
Figure 21C:
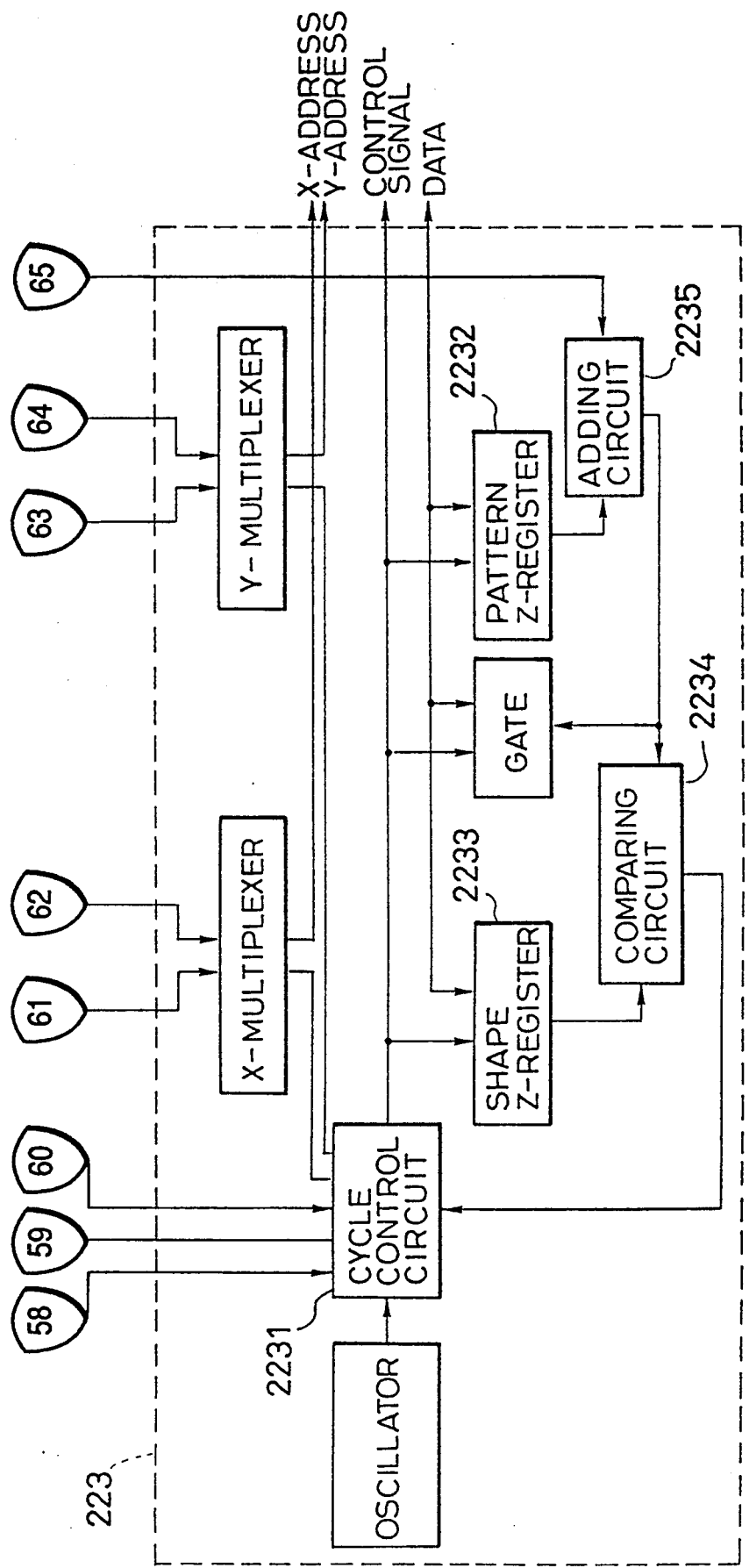

The three-dimensional shape change circuit 22 is roughly, as illustrated in block diagrams of FIGS. 21A to 21C, composed of a mode register section 221, an address generation section 222 and an arithmetic/control section 223.

Figure 22:
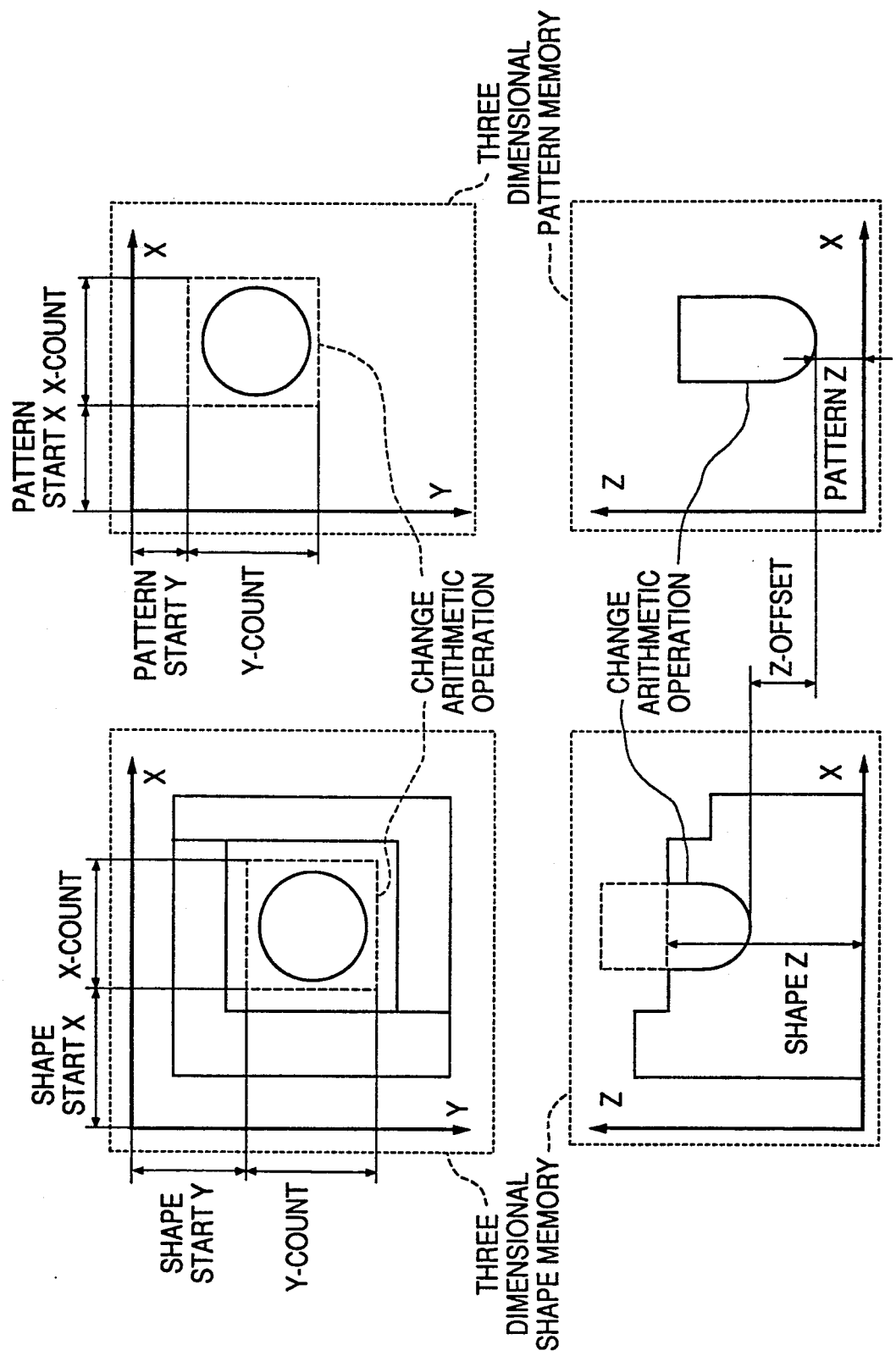
FIG. 22 is a diagram showing correspondences of changing operations to contents of the register group of the mode register module illustrated in FIGS. 21A to 21C.

The mode register section 221 comprises a group of a variety of registers for specifying the operation of the change circuit and is settable from the CPU 6 via the bus. FIG. 22 shows correspondences of changing operations to contents of the register group. The address generation section 222 is a circuit for scanning the X- and Y-addresses of the three-dimensional shape memory 11 and the three-dimensional pattern memory 21. The address generation section 222 is constructed of X- and Y-system counters. The X-system counter comprises an X-counter 2221, a shape X-counter 2222 and a pattern X-counter 2223. The Y-system counter comprises a Y-counter 2224, a shape Y-counter 2225 and a pattern Y-counter 2226. Among these counters, the X- and Y-counters 2221 and 2224 are intended to count the number of scanned data items; the shape X- and Y-counters 2222 and 2225 count the addresses of the three-dimensional shape memory 11; and the pattern X- and Y-counters 2223 and 2226 count the addresses of the three-dimensional pattern memory 21.

The operation of the X-system counter will be described. To start with, the CPU 6 accesses a start trigger generator 2211, thereby generating a start trigger signal.

When an X-counter control circuit 2227 receives the start trigger signal, load signals are transmitted to the X-counter 2221, the shape X-counter 2222 and the pattern X-counter 2223. An initial value is loaded from the mode register section 221. The X-counter 2221 is defined as a down-counter which operates with X-count clocks from a cycle control circuit 2231. The X-counter 2221 transmits an X-count end signal to the X-counter control circuit 2227 when the count value becomes "0".

When the X-counter control circuit 2227 receives the X-count end signal, the initial value is loaded again into the respective X-system counters. At the same time, Y-count clocks are transmitted to the Y-system counters. The shape X-counter 2222 and the pattern X-counter 2223 are up-counters which operate with the X-count clocks. Only the initial value is different.

Next, the operations of the Y-system counters will be explained. The Y-system counters are fundamentally the same as the X-system counters. However, they differ in that the counters operate with the Y-count clocks, and when a Y-counter control circuit 2228 receives the Y-count end signal, and a scan end signal is generated to stop the operation.

The arithmetic/control section 223 is a circuit for reading, on the basis of the X- and Y-addresses, a Z-value of the material shape from the three-dimensional shape memory 11 and a Z-value of the tool shape from the three-demensional pattern memory 21 and, when the tool shape is intruded in the material shape, reading the tool shape Z-value to the material shape.

FIGS. 23A to 23I are time charts of assistance in explaining the operation of the cycle control circuit 2231. The operation cycle includes a pattern Z-read cycle, a shape Z-read cycle and a shape Z-write cycle. These cycles are sequentially repeatedly executed till the scan end signal is received. The idle status is defined as a signal status during non-operation of the cycle control circuit.

At the pattern Z-read cycle, the X-count clocks are at first generated, and the scan is made to advance on step. Next, an X-multiplexer select and a Y-multiplexer select are set to "1". Outputs of the pattern X- and Y-counters 2223 and 2226 are given forth as X- and Y-addresses. The Z-value is read from the three-dimensional pattern memory 221 and latched in the pattern Z-register 2232. Note that the X-count clock is not generated at the cycle immediately after receiving the start trigger signal.

At the shape Z-read cycle, the X- and Y-multiplexer selects are set to "0". Outputs of the shape X- and Y-counters 2222 and 2225 are given forth as X- and Y-addresses. The Z-value is read from the three-dimensional shape memory 11 and latched in the shape Z-register 2233. At the shape Z-write cycle, the outputs of the shape X- and Y-counters 2222 and 2225 are given forth as X- and Y-addresses. The Z-value of the pattern Z-register 2232 is written to the three-dimensional shape memory 11. When finishing the shape Z-write cycle, the next operation is executed by returning to the pattern Z-read cycle. The shape Z-write cycle is executed by a comparing circuit 2234 which will be mentioned later only when it is judged that the material shape Z-value is greater than the tool shape Z-value. Whereas if not, the operation returns to the pattern Z-read cycle.

The comparing circuit 2234 inputs, to an adding circuit 2235, the tool shape Z-value of an offset Z-register 2212, thereby obtaining a tool Z-value to which the tool position is added. Inputted to the comparing circuit 2234 are this Z-value and the material shape Z-value of the shape Z-register 2233. A judgment result is outputted to the cycle control circuit 2231.

The access control circuit 23 is a circuit for arbitrating the accesses to the three-dimensional from the CPU 6 and the three-dimensional shape change circuit 22 so as to avoid a conflict.

(4) Expansion of Three-Dimensional Shape Change Section 20

The following are methods of expanding the three-dimensional shape change section 20 and effecting an interference check and a change of two-dimensional shape.

The interference checking method will be explained.

The three-dimensional shape change circuit 22 is intended to change the material shape when the tool shape is intruded in the material shape by scanning the three-dimensional shape memory 11 and the three-dimensional pattern memory 21. Instead of changing the material shape, the scan ceases upon detecting the intrusion, and an interrupt signal is generated with respect to the CPU 6. Simultaneously, the CPU 6 reads an interference position, and it may suffice that the interference position is displayable.

Concretely, just when the comparing circuit 2234 judges that the Z-value of the material shape is larger than the Z-value of the tool shape, the cycle control circuit 2231 generates the interrupt and provides an operation mode to enter the idle status. It also may suffice that values of the shape X- and Y-counters 2223 and 2226 can be read from the CPU 6.

In the actual machining simulation, when specifying the cutting feed, the operation is executed in the operation mode to change the material shape. When specifying the fast feed, the operation is executed in the interference check mode. An NC program check can be thus effectively performed.

The method of changing the two-dimensional shape will be explained.

In the machining simulation system depicted in FIGS. 2A to 2C, there is given the example of effecting the change arithmetic operation relative to the three-dimensional shape. The Z-directions of the three-dimensional shape memory 11 and of the three-dimensional pattern memory 21 are diminished down to 1 bit, whereby the change arithmetic operation of the two-dimensional shape can be effected. In this case, the arithmetic/control section 223 performs the arithmetic operation to write "0" to the bits of the material shape, if the bits of the tool shape are "1".

As discussed above, according to the machining simulation system of the present invention, the high-speed animation picture can be displayed irrespective of the processing capability of the CPU. Fine motions and a high resolution can be obtained. The display position and the enlargement ratio can be varied instantaneously. In addition, interference check and the high-definition display based on the luminance modulation are also possible. It is therefore feasible to quickly readily confirm a mistake in the NC program and the conditions, good or bad, of the machining procedures. The machining simulation system is provided at a low price and is therefore incorporated into an NC system and an automatic programming system. The machining simulation system can be widely utilized in the production sites, and the productivity can be improved.

Although the illustrative embodiment has been described in detail with reference to the accompanying drawings, it is to be understood that the present invention is not limited to that embodiment. Various changes or modifications may, as a matter of course, be effected therein by one skilled in the art without departing from the scope or spirit of the invention.

What is claimed is:

1. A machining simulation system for displaying an animation picture of a tool working a material, comprising:
    a display device for displaying said material;
    a timing generator for generating a synchronizing signal inputted to said display device, a dot position signal indicating a horizontal scanning position, a dot clock signal having a period which varies with every progress of a dot of a horizontal scanning, a line position signal indicating a vertical scanning position and a line clock signal having a period which varies with every progress of a line of a vertical scanning;
    a three dimensional shape memory for saving a Z-directional height of the material at an address designated by values of X and Y directions; and
    a cross-section display circuit comprising:
    (a) a display start dot register for designating a starting position of a horizontal display in said display device;
    (b) a dot count register for designating a width of the horizontal display in said display device;
    (c) a display start line register for designating a starting position of a vertical display in said display device;
    (d) a line count register for designating a width of the vertical display in said display device;
    (e) a shape start X-register and a shape start Y-register for designating starting addresses for reading in said three dimensional shape memory;
    (f) a Z-slice register for designating a Z-directional height of a displayed section;
    (g) a dot counter for starting a count of value in said dot clock signal when said dot position signal coincides with the value in said display start dot register and then for stopping the count of value in said dot clock signal when the count number coincides with the value in said dot count register;
    (h) a line counter for starting a count of value in said line clock signal when said line position signal coincides with the value in said display start line register and then for stopping the count of the value in said line clock signal when the count number coincides with the value in said line count register;
    (i) a shape X-counter for starting a count of the value in said dot clock signal after loading an initial value from said shape start X-register when said dot position signal coincides with the value in said display start dot register and then for stopping the count of the value in said dot clock signal when the count number in said dot counter coincides with the value in said dot count register; and
    (j) a shape Y-counter for starting a count of value in said line clock signal after loading an initial value from said shape start Y-register when said line position signal coincides with the value in said display start line register and then for stopping the count of the value in said line clock signal when the count number in said line counter coincides with the value in said line count register, so as to compare the Z-directional height read out from said three dimensional shape memory by the values in said shape X-counter and in said shape Y-counter as addresses and the value in said Z-slice register, and then inputting a high-luminance display signal to said display device when said Z-directional height is greater than said value in said Z-slice register or a low-luminance display signal to said display device when said Z-directional height is less than said value in said Z-slice register.

2. A machining simulation system as set forth is claim 1, wherein said cross-section display circuit for display an enlarged display or a reduced display according to variable count clock frequencies in said shape X-counter and in said shape Y-counter.

3. A machining simulation system as set forth in claim 1, wherein said cross-section display circuit is for shading a display in response to the height of the material according to converting the Z-directional height read out from said three dimensional shape memory into a luminance as the display signal.

4. A machining simulation system as set forth in claim 3, wherein said cross-section display circuit is for shading a display drawn shades and high-lights according to adding said luminance and a difference between the preceding Z-directional height read out from said three dimensional shape memory and then saved in a pre dot Z-register and the present Z-directional height read out from said three dimensional shape memory.

5. A machining simulation system for displaying an animation image of a tool working a material, comprising:
    a three dimensional shape memory for saving a Z-directional height of the material at an address designated by values of X and Y directions;
    a three dimensional pattern memory for saving a Z-directional height of the tool at an address designated by values of the X and Y directions; and
    a cross-section display circuit comprising:
    (a) a shape start X-register and a shape start Y-register for designating alterable starting positions;
    (b) a X-count register and a Y-count register for designating dimensions of alterable areas;
    (c) a pattern start X-register and a pattern start Y-register for designating reading starting positions in said three dimensional pattern memory;

(d) an offset Z-register for designating a Z-directional position of the tool;
(e) an oscillator for generating a clock;
(f) a X-counter for counting down using the clock of said oscillator after loading an initial value from said X-count register by a start trigger and then for loading said initial value from said X-count register again when the countdown becomes 0;
(g) a shape X-counter for counting using the clock of said oscillator after loading an initial value from said shape start X-register simultaneously with loading of said X-counter;
(h) a pattern X-counter for counting using the clock of said oscillator after loading an initial value from said pattern start X-register simultaneously with loading of said X-counter;
(i) a Y-counter for counting down once when a value in said X-counter becomes 0 after loading an initial value from said Y-count register by the start trigger and then for loading the initial value from said Y-count register again when the countdown becomes 0;
(j) a shape Y-counter for counting once when the value in said X-counter becomes 0 after loading an initial value from said shape start Y-register simultaneously with loading of said Y-counter; and
(k) a pattern Y-counter for counting once when the value in said X-counter becomes 0 after loading an initial value from said pattern start Y-register simultaneously with loading of said Y-counter, so as to compare a value added a value in said offset Z-register and the Z-directional height of the tool read out from said three dimensional pattern memory by the values in said pattern X-counter and in said pattern Y-counter as addresses and the Z-directional height of the material read out from said three dimensional shape memory by the values in said shape X-counter and in said shape Y-counter, and saving said added value into said three dimensional shape memory by the values in said shape X-counter and in said shape Y-counter as addresses when the Z-directional height of the material is less than said added value.

* * * * *